(12) United States Patent
Marunaka et al.

(10) Patent No.: US 10,131,275 B2
(45) Date of Patent: Nov. 20, 2018

(54) MOTIVE POWER OPERATION GUIDANCE APPARATUS

(71) Applicants: Kenji Marunaka, Kariya (JP); Daisuke Tsuji, Toyota (JP); Noriyuki Imanishi, Toyota (JP); Hiroshi Katou, Miyoshi (JP); Masaya Watanabe, Miyoshi (JP); Toru Ochi, Miyoshi (JP); Yasuhiro Tsutsumi, Susono (JP)

(72) Inventors: Kenji Marunaka, Kariya (JP); Daisuke Tsuji, Toyota (JP); Noriyuki Imanishi, Toyota (JP); Hiroshi Katou, Miyoshi (JP); Masaya Watanabe, Miyoshi (JP); Toru Ochi, Miyoshi (JP); Yasuhiro Tsutsumi, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 155 days.

(21) Appl. No.: 14/649,950

(22) PCT Filed: Dec. 10, 2013

(86) PCT No.: PCT/JP2013/083124
§ 371 (c)(1),
(2) Date: Jun. 5, 2015

(87) PCT Pub. No.: WO2014/097934
PCT Pub. Date: Jun. 26, 2014

(65) Prior Publication Data
US 2015/0314727 A1   Nov. 5, 2015

(30) Foreign Application Priority Data

Dec. 17, 2012   (JP) .................................. 2012-275148

(51) Int. Cl.
*B60K 35/00*   (2006.01)
*B60Q 5/00*   (2006.01)
(Continued)

(52) U.S. Cl.
CPC ................ *B60Q 5/008* (2013.01); *B60K 6/22* (2013.01); *B60K 35/00* (2013.01); *B60W 50/14* (2013.01); *F02D 29/00* (2013.01); *F02D 29/02* (2013.01)

(58) Field of Classification Search
None
See application file for complete search history.

(56) References Cited

U.S. PATENT DOCUMENTS 7,478,693 B1 *   1/2009   Curtis .................... B60K 6/105
                                                           180/165
7,893,822 B2 *   2/2011   Gerber ................... B60Q 1/503
                                                           180/65.235

(Continued)

FOREIGN PATENT DOCUMENTS

CN   103661402 A   3/2014
JP   2000-234538 A   8/2000

(Continued)

OTHER PUBLICATIONS

International Search Report of PCT/JP2013/083124 dated Mar. 25, 2014 [PCT/ISA/210].

*Primary Examiner* — Brian Zimmerman
*Assistant Examiner* — Renee Dorsey
(74) *Attorney, Agent, or Firm* — Sughrue Mion, PLLC

(57) ABSTRACT

A motive power stoppage guidance apparatus includes at least one of a display device configured to be disposed in a compartment of a vehicle, and a sound output device configured to output a sound in the compartment of the vehicle; and an indication control unit configured, when the vehicle is traveling in a state where a motive power stops, or when the likelihood is high in that the vehicle is traveling in the state where the motive power stops, to execute at least one of having the display device display at least one of that the (Continued)

motive power is in a stopped state, and a recommended operational method, and having the sound output device output an indication sound.

10 Claims, 24 Drawing Sheets

(51) Int. Cl.
  *B60K 6/22* (2007.10)
  *F02D 29/00* (2006.01)
  *B60W 50/14* (2012.01)
  *F02D 29/02* (2006.01)

(56) References Cited

U.S. PATENT DOCUMENTS

| | | | |
|---|---|---|---|
| 8,669,855 B2 * | 3/2014 | Suzuki | B60K 6/445 320/104 |
| 2005/0199209 A1 * | 9/2005 | Shimokawa | F02N 11/0822 123/179.4 |
| 2008/0163811 A1 * | 7/2008 | Nakamichi | B60K 35/00 116/62.4 |
| 2009/0322503 A1 * | 12/2009 | Suzuki | B60W 20/40 340/438 |
| 2011/0307134 A1 * | 12/2011 | Yoshimi | B60K 6/48 701/22 |
| 2014/0081561 A1 * | 3/2014 | Be | B60W 50/085 701/112 |
| 2014/0121865 A1 * | 5/2014 | Anderson | F02N 11/0822 701/22 |

FOREIGN PATENT DOCUMENTS

| | | |
|---|---|---|
| JP | 2005-256631 A | 9/2005 |
| JP | 2008170186 A | 7/2008 |
| JP | 2009-002236 A | 1/2009 |
| JP | 2009126464 A | 6/2009 |
| JP | 2009-198223 A | 9/2009 |
| JP | 2011-057115 A | 3/2011 |
| JP | 2012-006436 A | 1/2012 |

\* cited by examiner

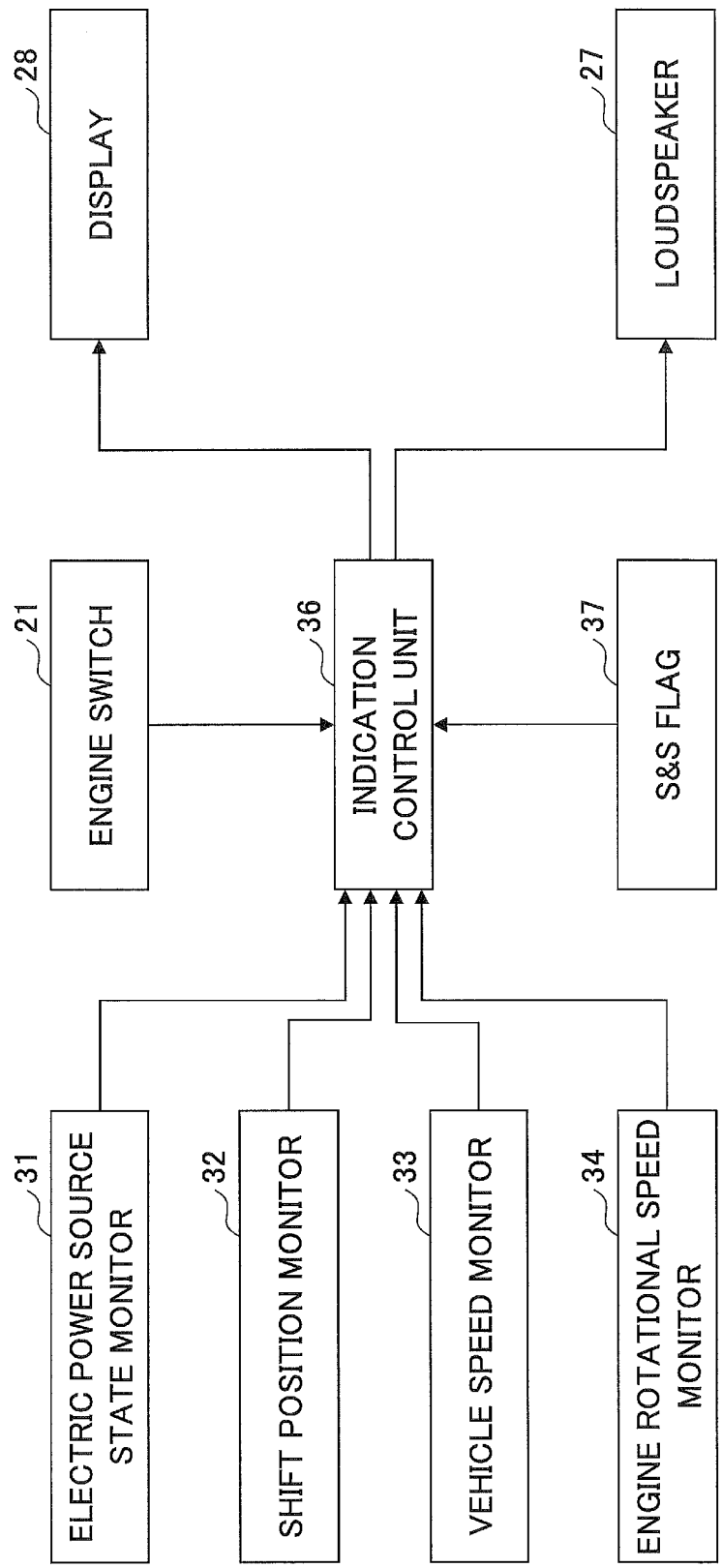

FIG. 5

| | WHAT TO BE DISPLAYED | | | | ALARM SOUND (BUZZER) |
|---|---|---|---|---|---|
| | AT VEHICLE (INCLUDING CVT) | MMT VEHICLE | SBW VEHICLE | MT VEHICLE | |
| III (EMERGENCY STOP) | TEACH EMERGENCY STOPPING<br>[KEEP PUSHING ENGINE SWITCH FOR EMERGENCY STOP OF ENGINE] | ↓ | ↓ | ↓ | 1 |
| IV | TEACH RESTARTING<br>[SHIFT TO N RANGE AND PUSH ENGINE SWITCH FOR RESTARTING] | ↓ | ↓ | TEACH RESTARTING<br>[STEP ON CLUTCH AND PUSH ENGINE SWITCH FOR RESTARTING] | 2 |
| V | ← | ← | (NOT GENERATED) | ← | |

FIG.6

| | WHAT TO BE DISPLAYED | | | | ALARM SOUND (BUZZER) |
|---|---|---|---|---|---|
| | AT VEHICLE (INCLUDING CVT) | MMT VEHICLE | SBW VEHICLE | MT VEHICLE | |
| III (EMERGENCY STOP) | NO | ↓ | ↓ | ↓ | NO |
| IV | NO | ↓ | ↓ | ↓ | NO |
| V | TEACH RESTARTING<br><br>SHIFT TO N RANGE AND TURN ENGINE SWITCH FOR RESTARTING | ↓ | (NOT GENERATED) | TEACH RESTARTING<br><br>STEP ON CLUTCH AND TURN ENGINE SWITCH FOR RESTARTING | 2 |

| | WHAT TO BE DISPLAYED | | | | ALARM SOUND (BUZZER) |
|---|---|---|---|---|---|
| | AT VEHICLE (INCLUDING CVT) | MMT VEHICLE | SBW VEHICLE | MT VEHICLE | |
| IV | PROMPT TO STOP VEHICLE<br><br>"ENGINE STOPPED, STOP VEHICLE AT SAFE PLACE" | ← | ← | NO | 1 |
| V | SHIFT TO P<br><br>"ENGINE STOPPED, SHIFT TO P RANGE"<br><br>BUT, IF "HV AND SHIFT N" AND "NOT SBW VEHICLE", DISPLAY BELOW<br><br>SHIFT TO P RANGE FOR STARTING | SHIFT TO N<br><br>"ENGINE STOPPED, SHIFT TO N RANGE"<br><br>BUT, IF "HV AND SHIFT N" AND "NOT SBW VEHICLE", DISPLAY BELOW<br><br>SHIFT TO N RANGE FOR STARTING | SHIFT TO P<br><br>"ENGINE STOPPED, SHIFT TO P RANGE"<br><br>BUT, IF "HV AND SHIFT N", DISPLAY BELOW<br><br>SHIFT TO P RANGE FOR STARTING | NO | 2 |
| VI | INDICATE CLEARLY, "NOT STARTED"<br><br>PUSH ENGINE SWITCH WHILE STEPPING ON BRAKE FOR STARTING | ← | ← | INDICATE CLEARLY, "NOT STARTED"<br><br>PUSH ENGINE SWITCH WHILE STEPPING ON CLUTCH FOR STARTING | NO |

| | AT VEHICLE (INCLUDING CVT) | WHAT TO BE DISPLAYED | | | ALARM SOUND (BUZZER) |
|---|---|---|---|---|---|
| | | MMT VEHICLE | SBW VEHICLE | MT VEHICLE | |
| IV | PROMPT TO STOP VEHICLE<br>"ENGINE STOPPED, STOP VEHICLE AT SAFE PLACE" | ↓ | ↓ | NO | 1 |
| V | SHIFT TO P<br>"ENGINE STOPPED, SHIFT TO P RANGE"<br>BUT, IF "HV AND SHIFT N" AND "NOT SBW VEHICLE", DISPLAY BELOW<br>SHIFT TO P RANGE FOR STARTING | SHIFT TO N<br>"ENGINE STOPPED, SHIFT TO N RANGE"<br>BUT, IF "HV AND SHIFT N" AND "NOT SBW VEHICLE", DISPLAY BELOW<br>SHIFT TO N RANGE FOR STARTING | SHIFT TO P<br>"ENGINE STOPPED, SHIFT TO P RANGE"<br>BUT, IF "HV AND SHIFT N", DISPLAY BELOW<br>SHIFT TO P RANGE FOR STARTING | NO | 2 |
| VI | NO | ↓ | ↓ | ↓ | NO |

FIG. 16

| | WHAT TO BE DISPLAYED | | | | ALARM SOUND (BUZZER) |
|---|---|---|---|---|---|
| | AT VEHICLE (INCLUDING CVT) | MMT VEHICLE | SBW VEHICLE | MT VEHICLE | |
| I ~ III | TEACH STARTING<br>"PUSH ENGINE SWITCH WHILE STEPPING ON BRAKE FOR STARTING" | ← | ← | TEACH STARTING<br>"PUSH ENGINE SWITCH WHILE STEPPING ON CLUTCH FOR STARTING" | NO |
| IV | SHIFT TO P<br>"ENGINE STOPPED, SHIFT TO P RANGE"<br>BUT, IF "HV AND SHIFT N" AND "NOT SBW VEHICLE", DISPLAY BELOW<br>"SHIFT TO P RANGE FOR STARTING" | SHIFT TO N<br>"ENGINE STOPPED, SHIFT TO N RANGE"<br>BUT, IF "HV AND SHIFT N" AND "NOT SBW VEHICLE", DISPLAY BELOW<br>"SHIFT TO N RANGE FOR STARTING" | SHIFT TO P<br>"ENGINE STOPPED, SHIFT TO P RANGE"<br>BUT, IF "HV AND SHIFT N", DISPLAY BELOW<br>"SHIFT TO P RANGE FOR STARTING" | NO | 2 |
| V | PROMPT TO STOP VEHICLE<br>"ENGINE STOPPED, STOP VEHICLE AT SAFE PLACE" | ← | ← | NO | 1 |

| | WHAT TO BE DISPLAYED | | | | ALARM SOUND (BUZZER) |
|---|---|---|---|---|---|
| | AT VEHICLE (INCLUDING CVT) | MMT VEHICLE | SBW VEHICLE | MT VEHICLE | |
| I~III | NO | ↓ | ↓ | ↓ | NO |
| IV | SHIFT TO P<br>"ENGINE STOPPED, SHIFT TO P RANGE"<br>BUT, IF "HV AND SHIFT N" AND "NOT SBW VEHICLE", DISPLAY BELOW<br>SHIFT TO P RANGE FOR STARTING | SHIFT TO N<br>"ENGINE STOPPED, SHIFT TO N RANGE"<br>BUT, IF "HV AND SHIFT N" AND "NOT SBW VEHICLE", DISPLAY BELOW<br>SHIFT TO N RANGE FOR STARTING | SHIFT TO P<br>"ENGINE STOPPED, SHIFT TO P RANGE"<br>BUT, IF "HV AND SHIFT N", DISPLAY BELOW<br>SHIFT TO P RANGE FOR STARTING | NO | 2 |
| V | PROMPT TO STOP VEHICLE<br>"ENGINE STOPPED, STOP VEHICLE AT SAFE PLACE" | ↓ | ↓ | NO | 1 |

FIG.17

MOTIVE POWER OPERATION GUIDANCE APPARATUS

CROSS REFERENCE TO RELATED APPLICATIONS

This application is a National Stage of International Application No. PCT/JP2013/083124, filed Dec. 10, 2013, claiming priority based on Japanese Patent Application No. 2012-275148, filed Dec. 17, 2012, the contents of all of which are incorporated herein by reference in their entirety.

TECHNICAL FIELD

The present invention relates to a motive power operation guidance apparatus that guides stoppage of the motive power and a starting method.

BACKGROUND ART

Motive power of vehicles has been diversified, and various technologies are installed depending on the motive power of a vehicle. For example, there has been a technology that has the engine of a vehicle stop automatically when the vehicle makes a temporary stop or the like, and has the engine restart automatically when the vehicle restarts (see, for example, Patent Document 1). Such a technology has been known as "idling stop". A vehicle in a state where the engine has stopped by idling stop, starts when a restart condition is satisfied, which is different from a case where the engine has stopped by a driver's operation. Also, vehicles that can stop engines while traveling (the vehicle speed is greater than zero) have come onto the market. Since such a vehicle can maintain normal vehicle performance while stopping the engine, stoppage of the engine does not necessarily mean stoppage of the motive power, and hence, it is difficult for a driver to determine whether the motive power stops. Also, in the first place, since silencing of engine sound has been improved, sound and vibration of engines have become less sensible.

Also, a hybrid vehicle has an EV mode in which the vehicle can travel normally even when the engine stops, and stoppage of the engine while traveling is not a rare phenomenon nowadays. Note that, in a hybrid vehicle, operation or stoppage of the motive power (at least one of the engine or the motor) can be recognized on a READY indicator in a meter panel (displayed when a relay turns on that is provided to supply a high voltage to the motive power source). As for an electric vehicle, it does not have an engine built in from the outset. Therefore, it can be considered as the same as a hybrid vehicle having the engine always stopped.

Also, an increasing number of vehicles now provide simple activation and stopping operations of the motive power implemented with push buttons or the like. As such an operation is simpler than rotating a mechanical key, there is a likelihood that a driver is not surely conscious that the operation the driver is doing is a stoppage operation. For example, one may be concerned about there is a likelihood that a driver mistakenly operates a push button that is not for activation or stoppage of the engine, or unintentionally stops the motive power.

A technology has been proposed that suppresses inconvenience generated if an engine starts while the engine is stopped, and the driver is not conscious of it (see, for example, Patent Document 2). Patent Document 2 discloses a control apparatus for stopping and starting an engine for an idling-stop vehicle. If the apparatus determines that there is a likelihood that the engine will go out of control when starting it, the apparatus indicates information about the engine that is not to be started, and information to prompt the driver to take necessary operations for starting the engine.

However, Patent Document 1 has a problem in that measures are not described that need to be taken when the motive power stops while traveling.

In a vehicle having an engine built in, the engine generates oil pressure and/or negative pressure, to be used for assisting power steering and assisting brake operations. Therefore, if the engine stops, vehicle functions are reduced into a state where the driver does not intend to be. Also, in a hybrid vehicle or an electric vehicle, the vehicle performance is reduced when it is transitioned out of a READY-ON state. Therefore, in a state where the motive power stops while traveling, it is preferable to promptly indicate the state to the driver to take appropriate measures.

[Patent Document 1] Japanese Laid-open Patent Publication No. 2009-2236

[Patent Document 2] Japanese Laid-open Patent Publication No. 2000-234538

SUMMARY OF THE INVENTION

Problem to be Solved by Invention

In view of the above, it is an object of embodiments of the present invention to provide a motive power stoppage guidance apparatus that can indicate to a driver if the motive power stops while traveling, or if the likelihood is high for such stoppage.

Means to Solve the Problem

According to an embodiment of the present invention, a motive power stoppage guidance apparatus includes at least one of a display device configured to be disposed in a compartment of a vehicle, and a sound output device configured to output a sound in the compartment of the vehicle; and an indication control unit configured, when the vehicle is traveling in a state where a motive power stops, or when the likelihood is high in that the vehicle is traveling in the state where the motive power stops, to execute at least one of having the display device display at least one of that the motive power is in a stopped state, and a recommended operational method, and having the sound output device output an indication sound.

Advantage of the Invention

According to embodiments of the present invention, it is possible to provide a motive power stoppage guidance apparatus that can indicate to a driver if the motive power stops while traveling, or if the likelihood is high for such stoppage.

BRIEF DESCRIPTION OF DRAWINGS

FIG. 4 is an example of a functional block diagram of a motive power stoppage guidance apparatus;

FIG. 5 is an example of a diagram illustrating correspondences between types of transmissions, and contents of messages and alarm sounds;

FIG. 6 is an example of a diagram illustrating correspondences between types of transmissions, and contents of messages and alarm sounds;

FIG. 11 is an example of a diagram illustrating correspondences between types of transmissions, and contents of messages and alarm sound (second embodiment);

FIG. 12 is an example of a diagram illustrating correspondences between types of transmissions, and contents of messages and alarm sound (second embodiment);

FIG. 16 is an example of a diagram illustrating correspondences between types of transmissions, and contents of messages and alarm sound (third embodiment);

FIG. 17 is an example of a diagram illustrating correspondences between types of transmissions, and contents of messages and alarm sound (third embodiment);

FIG. 22 is an example of a diagram illustrating transitions of electric power source states when operations are performed to transition to a READY-ON state on a slope or the like;

DESCRIPTION OF REFERENCE SYMBOLS

11 power management ECU
12 verification ECU
13 engine ECU
14 meter ECU
15 brake ECU
21 engine switch
36 indication control unit
100 motive power stoppage guidance apparatus

MODE FOR CARRYING OUT THE INVENTION

In the following, embodiments of the present invention will be described with reference to the drawings. However, the technological scope of the present invention is not limited to these embodiments.

A motive power stoppage guidance apparatus in the embodiments has a feature to indicate to the driver that "a vehicle travels in a state where the motive power stops" or "the likelihood is high in that the vehicle travels in a state where the motive power stops". Note that the motive power includes at least one of an engine and an electric motor.

First Embodiment

Figure 1:
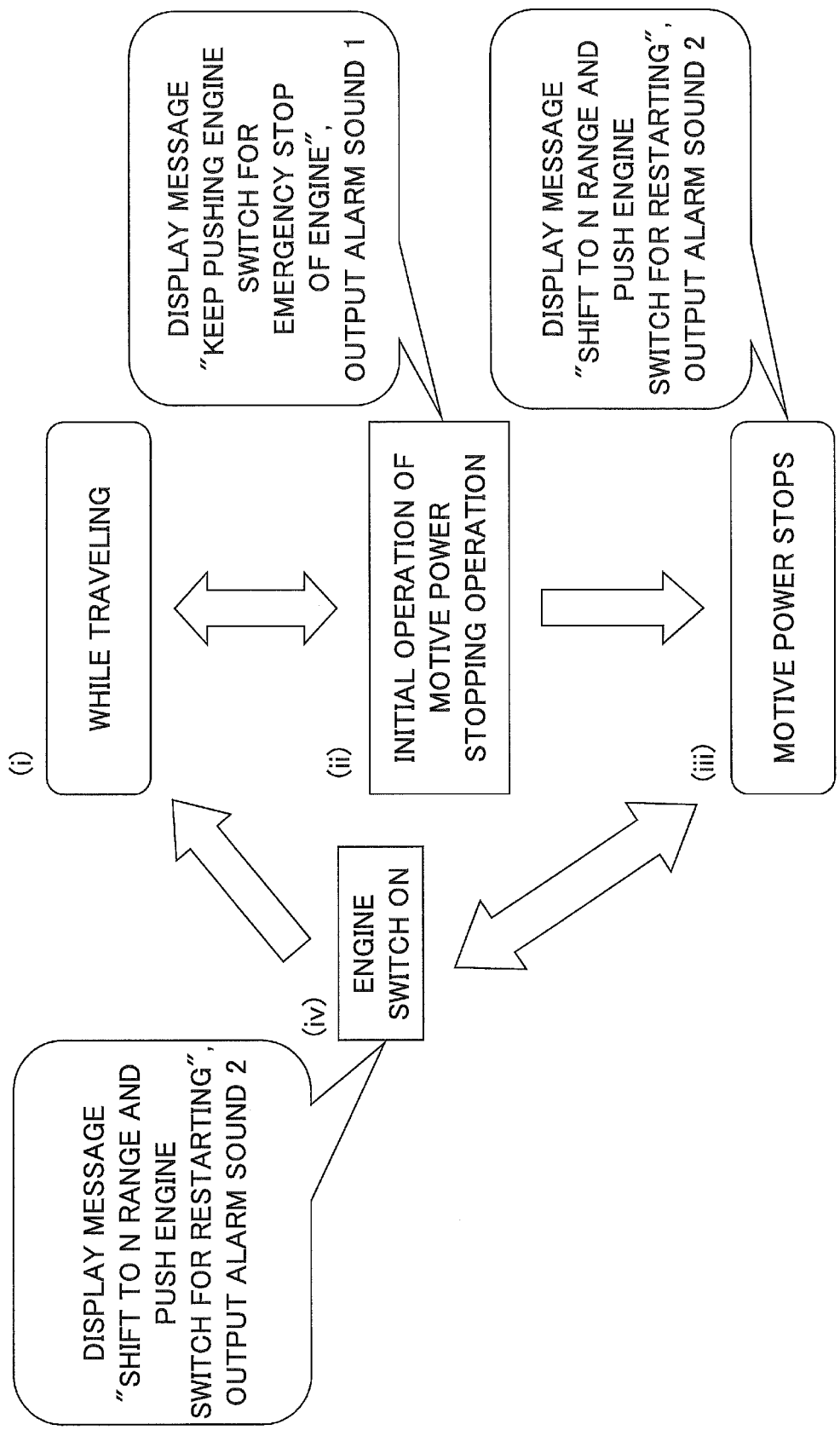
FIG. 1 is an example of a diagram illustrating basic features of a motive power stoppage guidance apparatus according to an embodiment of the present invention.

FIG. 1 is an example of a diagram illustrating basic features of a motive power stoppage guidance apparatus according to an embodiment of the present invention. Here, a vehicle that has an engine (a gasoline engine, a diesel engine, a rotary engine, or the like) as its only motive power source (simply referred to as an "engine vehicle" below) will be taken as an example for description.

The engine vehicle has a function built in that stops the motive power when the driver intends to do so in case of emergency (referred to as a "motive power stopping function"). The motive power stopping function is disposed within a range easily reachable from the driver's seat so that the driver can operate it in case of emergency. Although it depends on vehicles, there are cases where it is also used as a push button to activate the motive power. However, an operational method that stops the motive power by operating the push button for activating the motive power cannot be said to be wide-spread. Therefore, it is more preferable, (a) to teach a stopping method of the motive power when the driver stops the motive power in case of emergency; and (b) if the push button is operated when the driver does not intend to stop the motive power, to indicate that the likelihood is high that the motive power will stop while traveling.

(i) The engine vehicle is traveling. While traveling, the motive power can be stopped by a motive power stopping operation. To exclude a momentary operation, the motive power stopping operation is allocated as an operation that requires a passage of time, such as a "long push of the push button", or "repeatedly pressing down the push button".

(ii) When an initial operation of the motive power stopping operation is detected, to indicate (a) and (b), the motive power stoppage guidance apparatus makes at least one of indications by displaying a message, and by outputting an alarm sound 1 (such indication forms may be described using "and/or" below). Therefore, it is easier to understand for the driver that the driver is performing an unusual operation. When the driver understands the indication, and stops the motive power stopping operation, then, the state transitions back to "while traveling".

(iii) When the driver understands the indication but does not stop the motive power stopping operation, or does not understand the indication and does not stop the motive power stopping operation, then, the motive power stops. The vehicle continues to travel by inertia. In this case, (c) to make the driver aware that the engine has stopped, and to teach a restarting method so that the driver can restart the engine, may help the driver or may be more preferable for the driver.

Therefore, the motive power stoppage guidance apparatus makes at least one of indications of displaying a message and outputting an alarm sound 2. Therefore, it is easier for the driver to understand that the motive power stops, and the restarting method of the motive power.

(iv) When the driver recognizes that the motive power has stopped, the driver restarts the engine (turns on the engine switch). However, when the driver starts the engine, it is often the case that the driver forgets to set the shift position to N range. In this case, (d) it is preferable to teach the restarting method so that the driver can restart the engine.

Therefore, the motive power stoppage guidance apparatus makes at least one of indications of displaying a message or outputting an alarm sound 2. This makes the restarting method of the motive power more easily understandable for the driver. When the shift position is at N range, and the engine switch is operated to be turned on, then, the motive power starts, and the state transitions back to "while traveling".

Note that the messages in FIG. 1 are for transmissions of AT (automatic transmission) and CVT (Continuously Variable Transmission); for MT (manual transmission), stepping on a clutch pedal or the like corresponds to restarting, instead of setting to N range. Understandably, appropriate messages are displayed for restarting the engine depending on transmissions.

As above, the motive power stoppage guidance apparatus in the embodiments can indicate that "a vehicle travels in a state where the motive power stops" or "the likelihood is high in that the vehicle travels in a state where the motive power stops". The driver can recognize that the motive power stops earlier than the driver recognizes it by himself with performance of the vehicle or the engine sound. Also, the starting method of the engine can be understood more easily.

Configuration Example

Figure 2:
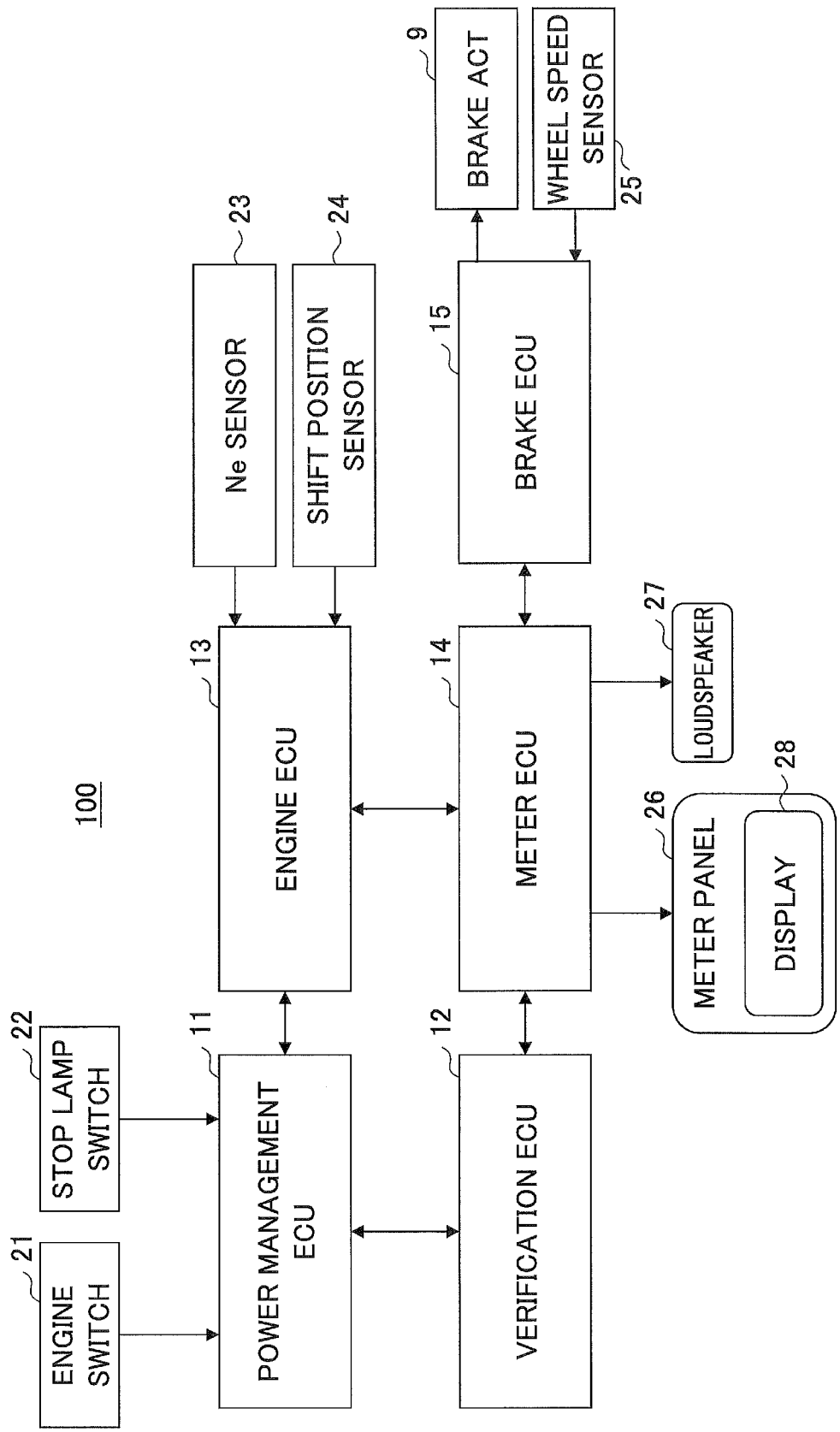
FIG. 2 is an example of a basic configuration diagram of a motive power stoppage guidance apparatus.

FIG. 2 is an example of a basic configuration diagram of a motive power stoppage guidance apparatus 100. The motive power stoppage guidance apparatus 100 includes a meter ECU (Electronic Control Unit) 14, a power management ECU 11, an engine ECU 13, a verification ECU 12, a brake ECU 15, and a meter panel 26. Names of the illustrated ECUs are just examples, and there may be one or more ECUs and a meter panel 26. The ECUs are connected with each other via an in-vehicle network such as a CAN (Controller Area Network), a FlexRay, a LIN (Local Interconnect Network), or the like.

Each of the ECUs includes a microcomputer, input/output I/Fs to be connected with sensors and actuators, and an electric power source circuit. Also, the microcomputer has a basic configuration that includes a CPU, a RAM, a ROM, a non-volatile memory, and I/Os. The ROM stores a program that is loaded into the RAM to be executed by the CPU, which implements an indication function as will be described later.

The brake ECU 15 is connected with a brake ACT (actuator) 9. The brake ACT 9 includes a passage for brake fluid, open and close valves, and a pump to generate braking pressure. Also, the brake ECU 15 is connected with wheel speed sensors 25, and by controlling the brake ACT, based on the wheel speed and the like, executes ABS and/or TRC to control braking forces of the wheels independently. Note that the brake ECU 15 is an example of an ECU that detects the vehicle speed, and may be any ECU as long as it outputs the wheel speed to the meter ECU 14.

The engine ECU 13 executes a variety of control such as fuel injection control, ignition timing control, and throttle opening control for the engine as an internal combustion engine. This engine ECU 13 has a function built in as a whole to control the transmission. The engine ECU 13 is connected with an Ne sensor (crank position sensor) 23 that detects rotational speed of the engine, and a shift position sensor 24 that detects a shift position, which is an operational position of the shift lever. When the shift position is at D (drive) range, the engine ECU 13 refers to a map based on the accelerator opening and the vehicle speed, to switch gear stages of the transmission.

The verification ECU 12 is connected with an antenna in the vehicle to communicate with an electronic key carried by the driver, and if an ID transmitted from the electronic key coincides with an ID registered in advance, outputs a verification OK to the power management ECU 11.

The power management ECU 11 starts and stops the engine, controls a relay, and manages the state of an electric power source. The power management ECU 11 is connected with an engine switch 21 and a stop lamp switch 22. When detecting that the engine switch 21 turns on in a state where the stop lamp switch 22 is on (a state where the brake pedal is stepped on, which may be referred to as "the brake is on" below), the power management ECU starts the engine by turning on a starter relay when the shift position is at P or N.

The meter ECU 14 controls displaying a tachometer, a speedometer, a water thermometer, a fuel meter, and a shift range on the meter panel 26. Also, the meter panel 26 provides a display 28, on which a variety of information can be displayed. Note that the display 28 is a panel of an LCD or an organic EL, or may adopt a heads-up display. Also, the display of a navigation apparatus may be used as the display 28. On this display 28, stoppage of the engine or a restarting method are displayed. Also, the meter ECU 14 is connected with a loudspeaker 27 that outputs various alarm sounds, buzzers, and messages by sound. In the embodiments below, a message to be displayed may be output by sound from the loudspeaker 27.

[States of Engine and States of Electric Power Source]

Figure 3:
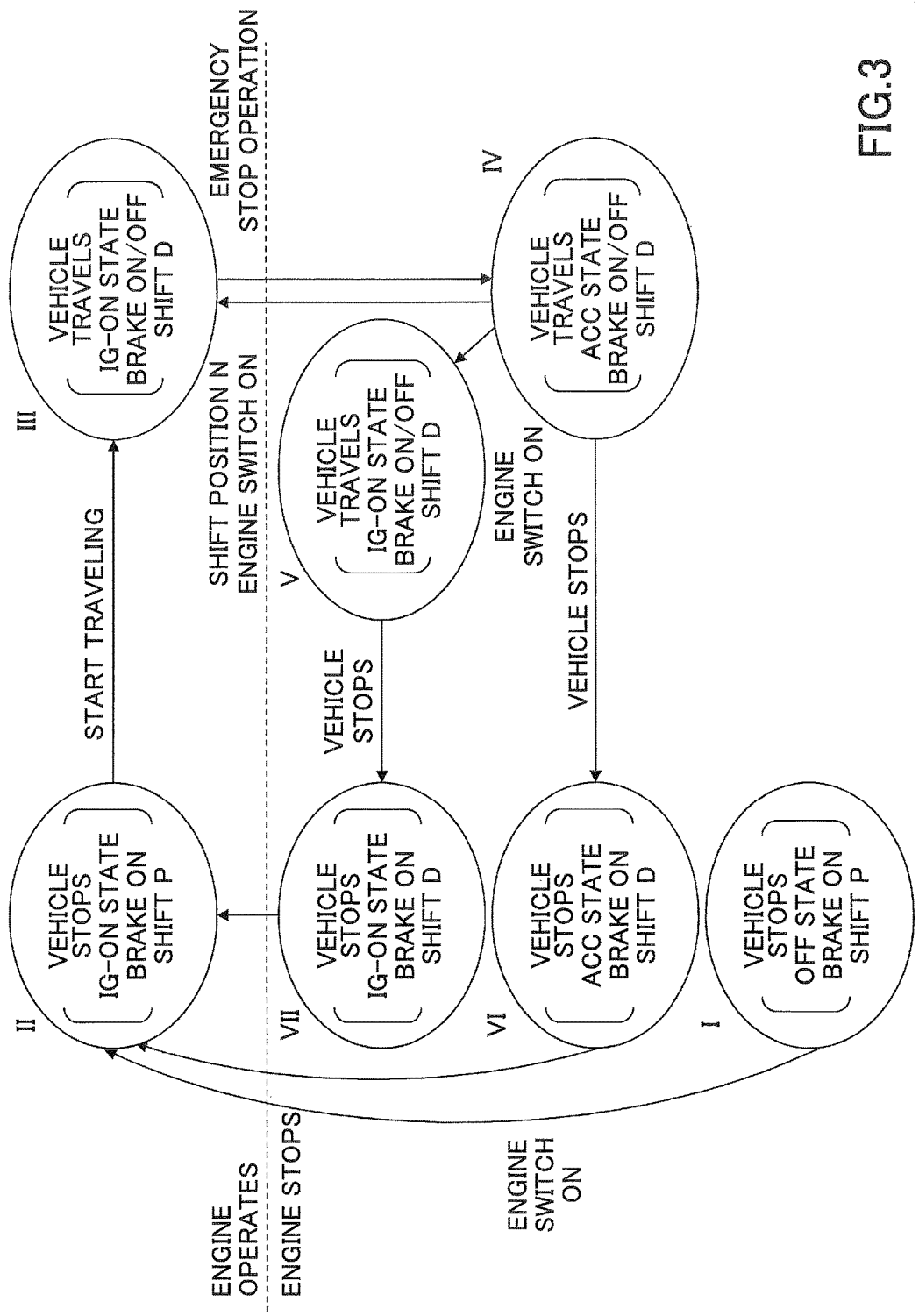
FIG. 3 is an example of a diagram illustrating states of a vehicle and their transitions.

FIG. 3 is an example of a diagram illustrating states of the vehicle and their transitions. In the present embodiment, a state of the vehicle is a combination of an electric power source state, traveling or not, on/off of the brake pedal, and an operational position of the shift lever, either when the engine stops or operates. Also, in the following drawings, illustration is omitted for transitions other than main transitions relevant to the present embodiment.

I. A state when the vehicle stops for passengers to get on the vehicle is taken as the initial state. In this state, the electric power source state is an "OFF state". The engine starting condition in this state is as follows:
the brake on;
the shift position at N or P (preferably P); and
the engine switch on.

Note that the power management ECU 11 starts the engine by turning on the starter relay to drive a starter motor.

II. Having the engine started, the electric power source transitions to an "IG-ON state".

III. In the state where the engine has started, if the driver operates the shift lever to D, and steps on the accelerator pedal to have the vehicle travel, the vehicle accelerates to travel at vehicle speed greater than zero. Note that "while traveling" is a state where the vehicle speed is greater than zero, and "while stopping" is a state where the vehicle speed is zero or can be considered as zero.

IV. In state III, if the driver performs an emergency stop operation, the engine stops, and the electric power source state transitions to an ACC state. The engine starting condition at this state is as follows. Note that the power management ECU 11 stops the engine by turning off an IG relay to stop ignitions and fuel supply.

the shift position N; and
the engine switch on;

If the engine starts in the ACC state transitioned by an emergency stop in this way, the state transitions back to state III.

V. If the driver turns on the engine switch without operating the shift position to N, the electric power source state transitions to an IG-ON state while the vehicle continues to travel. Namely, the electric power source state changes, but the engine continues to stop. The engine starting condition in this state is the same as that in IV.

VI. If the driver performs an emergency stop operation, the engine stops while the electric power source state continues to be in the ACC state, and the vehicle stops; then, the vehicle transitions to a stopped state with the ACC state. If the operational position of the shift lever is operated to P (or N) in this state to have the same engine starting condition as in state I, the engine can be started.

VII. If the vehicle stops in state V, the vehicle transitions to a stopped state with the IG-ON state. If the operational position of the shift lever is operated to P (or N) in this state to have the same engine starting condition as in state I, the engine can be started.

[Functional Blocks of Motive Power Stoppage Guidance Apparatus]

FIG. 4 illustrates an example of a functional block diagram of the motive power stoppage guidance apparatus 100. Functions in the figure may be held by any of the ECUs, and names and segmentation of the functions are just examples. An electric power source state monitor 31 monitors the electric power source state of the vehicle, to output the state to an indication control unit 36. As described with FIG. 3, the electric power source state transitions with respect to the vehicle state when the engine switch is turned on. Also, it may transition when time passes.

A shift position monitor 32 monitors the operational position of the shift lever that is detected by the shift position sensor, to output the position to the indication control unit 36. Note that if the electric power source state is an off state or an ACC state, and if the shift position is at N range or P range, a starter relay operation signal of the power management ECU 11 can be output to the starter relay.

A vehicle speed monitor 33 monitors the vehicle speed by a vehicle speed signal detected by the wheel speed sensor 25, to output the vehicle speed to the indication control unit 36. Since the wheel speed sensor 25 may not output the wheel speed if the engine is not operating, the indication control unit 36 stores the vehicle speed and time just before the electric power source state transitions out of an IG-ON state.

An engine rotational speed monitor 34 calculates the engine rotational speed by a crank angle signal detected by the Ne sensor 23, to output it to the indication control unit 36. The engine rotational speed signal may not be output if the engine is not operating. An S&S flag 37 is a flag that is set on if a start & stop vehicle, which will be described later, stops the engine, and is set off when restarting.

[Messages and Output Timings]

When a predetermined condition is satisfied, the indication control unit 36 displays a message, and/or outputs an alarm sound. For example, they are indicated at the following timings:

A. When an emergency stop operation is detected starting in state III in FIG. 3;
B. When having transitioned to state IV in FIG. 3; and
C. When having transitioned to state V in FIG. 3.

An emergency stop operation in III is a long push of the engine switch (for example, three seconds or longer), or a predetermined number (for example, three) or more of operations of the engine switch within a predetermined time. By setting such conditions of time or the number of operations to identify the operation, erroneous engine stoppage by the driver can be reduced.

State IV is detected when the electric power source is in an ACC state, and the engine rotational speed is in a range that can be considered as zero. The vehicle speed may be determined by monitoring transmitted vehicle speed as it is, or by determining whether the vehicle is traveling or has stopped from the vehicle speed and time stored most recently. For example, it may be determined as "while traveling" when one minute has not yet passed since the last-recorded time of the vehicle speed, and as "while stopping" thereafter. Also, if the last-recorded vehicle speed is greater, the time may be set greater for determining as "while traveling", and determining as "while stopping" thereafter. The shift position is monitored by the shift position monitor 32. Note that if it is difficult for the engine ECU to detect the engine rotational speed as the electric power source is in the ACC state, the indication control unit 36 may detect that the engine stops because it is the ACC state, and the engine rotational speed cannot be obtained.

State V is similar to state IV except for having an IG-ON state due to the engine switch on. In state V, the shift position is not at N range (because it is difficult to operate the shift position to P while the vehicle is traveling). Therefore, if the engine switch is operated on, but the electric power source state is an IG-ON state, and the engine rotational speed is zero or the engine rotational speed is not obtained; then, it is determined as state V.

The indication control unit 36 detects a timing to display a message, and/or to output an alarm sound from the electric power source state and the engine rotational speed. For cases A to C below, messages to be displayed and alarm sounds to be output are, for example, as follows. The wording and combination may be changed appropriately:

A message: "The engine makes an emergency stop, by keep pushing the engine switch",
 alarm sound 1: intermittent buzzer sound;
B message: "Shift to N range and push the engine switch for restarting",
 alarm sound 2: continuous buzzer sound; and
C message: "Shift to N range and push the engine switch for restarting",
 alarm sound 2: continuous buzzer sound;

The driver can understand easier a current circumstance and measures to be taken for each of the states. By A, a stopping method to stop the motive power in case of emergency is more understandable. Also, it is easier to understand that the engine switch 21 has been operated without an intention to stop the motive power. By B, it is easier to understand that the engine has stopped, and a restarting method. By C, the restarting method is easier to understand.

Also, by changing the messages and the alarm sounds for state III and state IV, the driver can understand that the circumstance has changed. Note that the messages and the alarm sounds may be changed for state IV and state V. For example, the message about engine stoppage may be displayed in only one of states IV and V.

<About Vehicle that Starts Engine with Mechanical Key>

For a vehicle that starts the engine with a mechanical key (referred to as a "mecha-key"), it is well known that a rightward rotational operation on the mecha-key starts the engine, and a leftward rotational operation stops the engine. Therefore, indications by messages and/or alarm sounds may be minimized. For example, only for the case "C. state V in FIG. 3", displaying a message and/or outputting an alarm sound may be executed similarly to a case with an electronic key.

<About Differences of Transmissions>

Also, it is effective to change outputting forms of messages and alarm sounds by transmission types. The above example is for an AT vehicle or a CVT vehicle; other transmissions includes MMT (Multi mode Manual Transmission) and SBW (Shift By Wire). Outputting forms of messages and alarm sounds can be designed to have appropriate contents depending on differences of transmissions.

FIGS. 5 and 6 are examples of diagrams illustrating correspondences between types of transmissions, and contents of messages and alarm sounds. Note that FIG. 5 illustrates a case for an electronic key, and FIG. 6 illustrates a case for a mecha-key.

<About Start-and-Stop Installed Vehicle>

There are cases where the engine does not virtually stop even when the engine stops. A case where the engine does not virtually stop means that although an ECU has the engine stop under a predetermined condition, the ECU starts the engine again under a predetermined condition (even if the driver does not turn on the engine switch). Such a function is called "idling stop" or "start & stop" (referred to as "S&S" without distinguishing the names, below).

An engine stopping condition and an engine restarting condition for a vehicle having the S&S installed are, for example, as follows. Note that the conditions are just examples; actual engine stop conditions and engine restarting conditions depend on vehicles and/or manufacturers:

Engine Stop Condition:
the shift position at D range;
the brake pedal on; and
the vehicle speed less than or equal to threshold (for example, around 10 km/h to 0 km/h).

Engine Restarting Condition:
the brake pedal off.

Therefore, a vehicle having the S&S installed may transition to state IV or V even if the driver does not turn on the engine switch. For such a vehicle having the S&S installed in state IV or V, even if the driver does not start the engine, a predetermined ECU (assume this ECU is a power management ECU 11 below) restarts the engine, and hence, a message and an alarm sound are not required.

Thereupon, the indication control unit 36 detects by the S&S flag 37 that the power management ECU 11 has stopped the engine by the S&S control, and determines whether to display a message and/or to output an alarm sound.

[Operational Steps]

Figure 7:
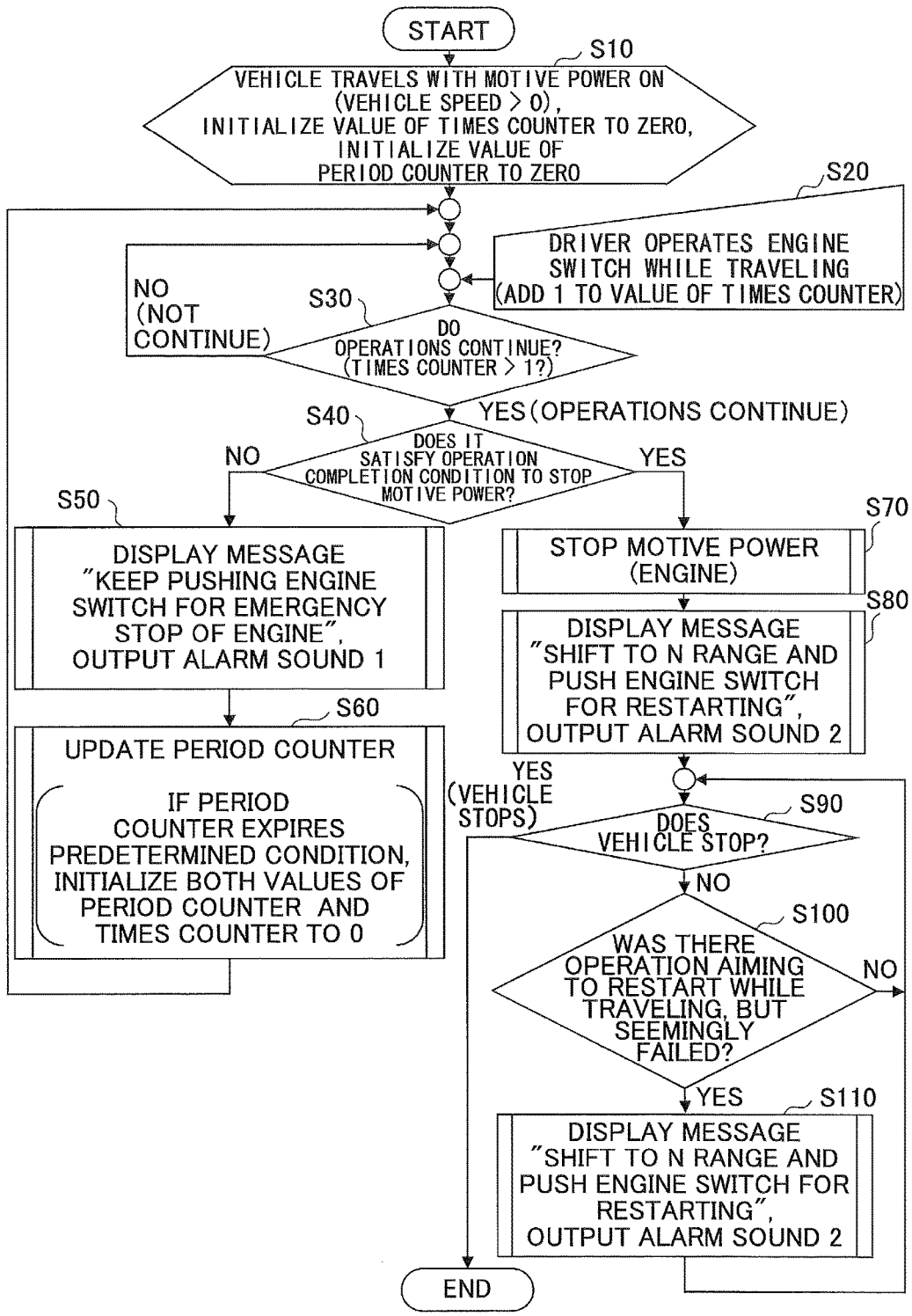
FIG. 7 is an example of a flowchart illustrating an example of operational steps of a motive power stoppage guidance apparatus.

FIG. 7 is an example of a flowchart illustrating an example of operational steps of the motive power stoppage guidance apparatus 100 according to the present embodiment. Steps in FIG. 7 start with state III in FIG. 3.

Step S10: A vehicle is in a state where the engine operates, the vehicle is traveling, and the electric power source state is an IG-ON state. The power management ECU 11 initializes values of a times counter and a period counter to zero, respectively, which are storage devices provided in the power management ECU. Note that the times counter and period counter are counters to determine whether a predetermined time and a predetermined number of times are satisfied, respectively, as operation completion conditions to stop the engine at later Steps S30 and S40.

Step S20: The power management ECU 11 detects that the driver operates the engine switch to on while traveling, and adds "1" to the value of the times counter to update it.

Step S30: The power management ECU 11 determines whether it is in a state where the predetermined time and the predetermined number of times are being counted, which are set as the conditions to stop the engine, with reference to the value of the times counter. If the value of the times counter is less than 1, the determination is repeated until an operation is detected at Step S20, the value of the times counter is greater than or equal to 1, and a YES determination is obtained at Step S30.

Step S40: The power management ECU 11 determines whether a series of on operations of the engine switch satisfies the operation completion condition to stop the engine. Namely, the power management ECU 11 determines whether an on operation is detected that continues for the predetermined time or longer, or determines whether on operations are detected greater than or equal to the predetermined number of times within the predetermined time with reference to the value of the period counter and the value of the times counter.

Step S50: If the operation completion condition of the engine stoppage is not satisfied (NO at Step S40), the indication control unit 36 displays a message "Keep pushing the engine switch for an emergency stop of the engine", and/or outputs an alarm sound 1. Thus, it is possible to teach a stopping method of the motive power when the driver stops the motive power in case of emergency, and to indicate a high likelihood that the motive power stops while traveling when the push button is operated even if the driver does not have an intention to stop the motive power.

Step S60: The power management ECU 11 updates the period counter and times counter as follows. The value of the period counter is updated to a time that is required to complete the steps after the times counter exceeds 1. Then, if the value of the period counter exceeds a certain time used as the operation completion condition, the power management ECU 11 initializes both values of the period counter and times counter to 0 (zero), respectively. Thus, when the driver operates the engine switch next time, whether the operation completion condition is satisfied is determined.

Step S70: If the operation completion condition of the engine stoppage is satisfied (YES at Step S40), the power management ECU 11 stops the engine. Also, the indication control unit 36 records the vehicle speed and the time. The vehicle transitions to state IV.

Step S80: The indication control unit 36 displays a message "Shift to N range and push the engine switch for restarting", and/or outputs an alarm sound 2. Thus, if the drivers stops the motive power unintentionally or intentionally, a restarting method can be taught.

Step S90: Next, the indication control unit 36 determines whether the vehicle stops. Namely, the indication control unit 36 determines whether the vehicle speed is zero, or if the vehicle speed cannot be obtained, determines whether a predetermined time has passed since the engine has stopped.

If it is determined that the vehicle has stopped (YES at Step S90), the power management ECU sets the same engine starting condition as in state I.

Step S100: If it is determined that the vehicle does not stop (NO at Step S90), the indication control unit 36 determines whether there is an operation that was performed to restart while traveling but seems to have failed in restarting. Namely, the indication control unit 36 determines whether the engine switch is operated to on, and the state transitions to state V. If there is no operation that seems to have failed in restarting (NO at Step S100), the indication control unit 36 does not output a message and the like.

Step S110: If there is an operation that seems to have failed in restarting (YES at Step S100), the indication control unit 36 displays a message "Shift to N range and push the engine switch for restarting", and/or outputs an alarm sound 2. This message and the like continue until it is determined that the vehicle has stopped. Thus, if failing in restarting, the restarting method can be taught.

[Hybrid Vehicle and Electric Vehicle (EV)]

For a hybrid vehicle, the motive power is an electric motor or an engine, and for an EV, the motive power is an electric motor.

In addition, for a hybrid vehicle, the electric power source state includes READY-ON states. A READY-ON state is a state where traveling can be realized by an electric motor or an engine as the motive power, which does not depend on whether the engine actually operates or stops. If not in a READY-ON state, the engine does not operate, and whether the engine actually operates in a READY-ON state is determined by the residual quantity of the battery, an acceleration operation by the driver, the vehicle speed and the like. Also, for an EV, a READY-ON state is a state where traveling can be realized by an electric motor as the motive power. Therefore, for a hybrid vehicle or an EV, an engine operating state of an engine vehicle corresponds to a READY-ON state. Stopping the motive power is to change the electric power source state from a READY-ON state to a state other than READY-ON states (for example, a READY-off state or an ACC state).

Figure 8:
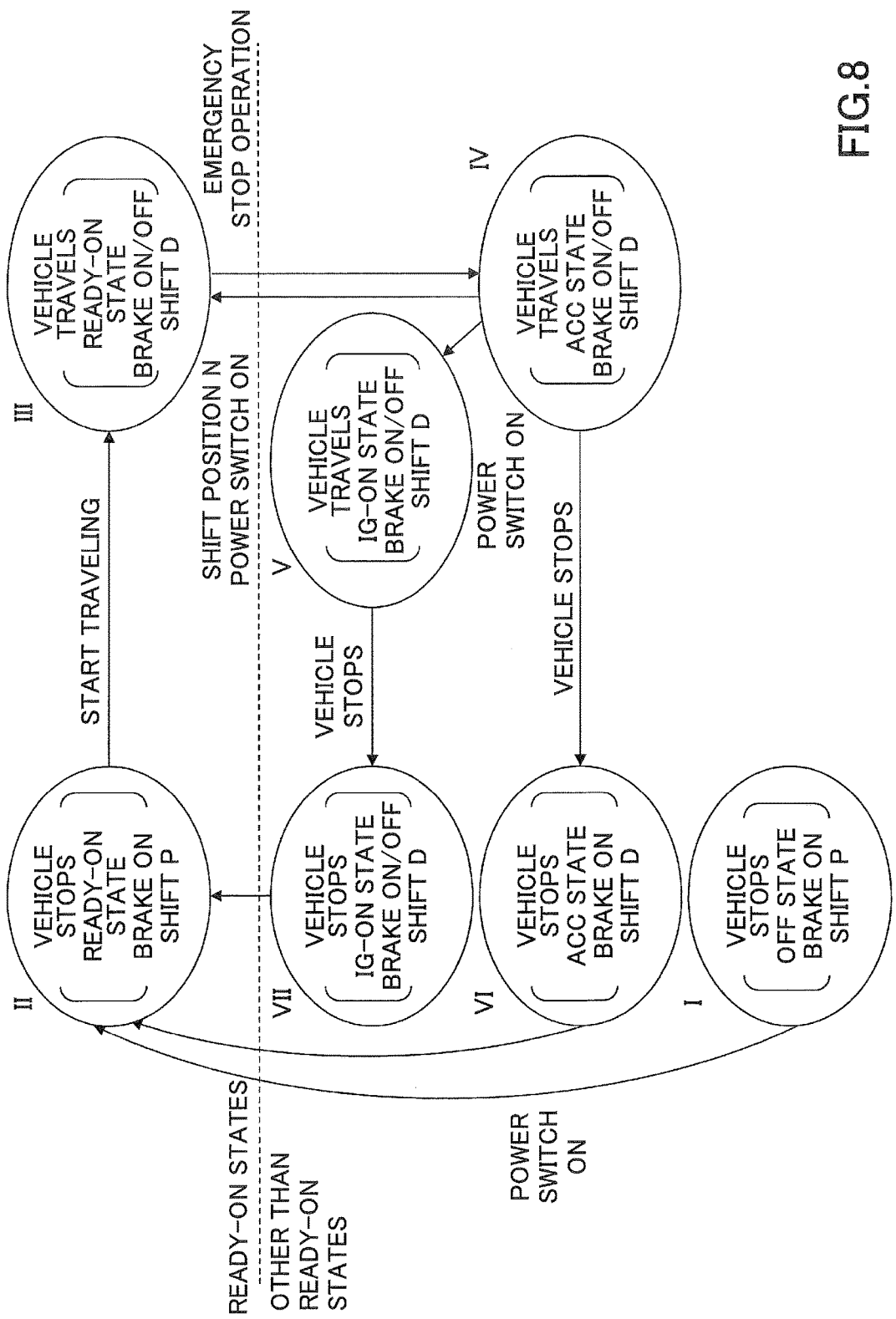
FIG. 8 is an example of a diagram illustrating states of a vehicle and their transitions.

FIG. 8 is an example of a diagram illustrating states of a vehicle and their transitions. The transition diagram is similar to that in FIG. 3, and core parts will be mainly described. "ENGINE OPERATES" is replaced with "READY-ON STATES", and "ENGINE STOPS" is replaced with "OTHER THAN READY-ON STATES". Note that for a hybrid vehicle or an EV, the engine switch is called the "power switch".

I. A state when the vehicle stops for passengers to get on the vehicle is taken as the initial state. In this state, the electric power source state is an "OFF state". The engine starting condition in this state is as follows:
the brake on;
the shift position at P; and
the power switch on.

IV. If the driver completes an emergency stop operation in state III, the electric power source transitions to an ACC state. The READY-ON condition in this state is as follows:
the shift position N; and the power switch ON.

Although the vehicle state is a bit different as such, the motive power stoppage guidance apparatus 100 can display a message and/or output an alarm sound, similarly to the case of an engine vehicle.

Figure 9:
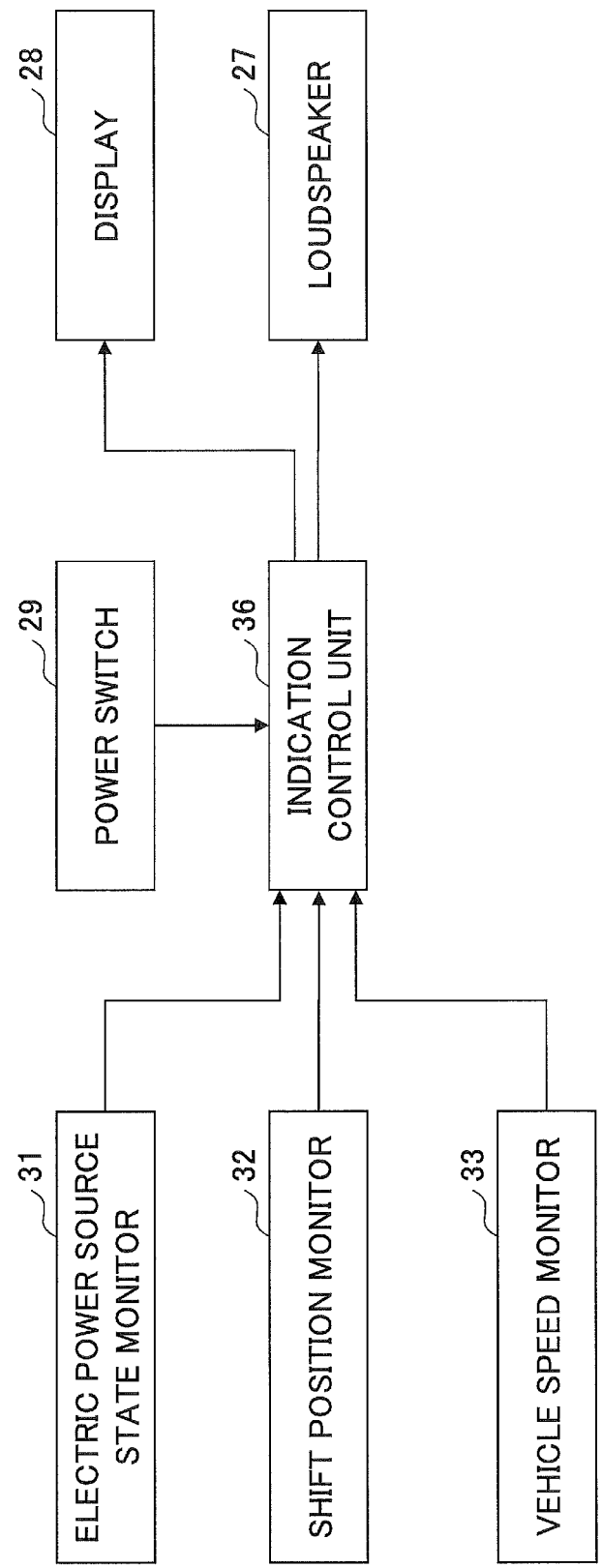
FIG. 9 is an example of a functional block diagram of a motive power stoppage guidance apparatus of a hybrid vehicle or an electric vehicle (EV)

FIG. 9 is an example of a functional block diagram of the motive power stoppage guidance apparatus 100 of a hybrid vehicle or an EV. Note that although the system configuration diagram may be the same as that in FIG. 2, for a hybrid vehicle, the power management ECU 11 may have a control function of a hybrid system built in. In such a case, the power management ECU 11 determines the engine output and the motor output depending on a driving state, based on the accelerator opening, the shift position, and signals from various sensors, and outputs them to the engine ECU and the motor ECU.

The functional block diagram differs from FIG. 4 in that the engine rotational speed monitor 34 and the S&S flag 37 do not need to be included. The engine rotational speed monitor 34 is not required because the electric power source state monitor 31 indicates when it is not in a READY-ON state. Also, it is often the case that a hybrid vehicle or an EV does not have the S&S function built in, and hence, the S&S flag 37 is not required. Namely, since a hybrid vehicle stops the engine when the accelerator pedal is off, it essentially includes the S&S function. Also, since an EV does not have an engine built in, the S&S function cannot be built in.

When a predetermined condition is satisfied, the indication control unit 36 displays a message, and/or outputs an alarm sound:

A. When an emergency stop operation is detected in state III in FIG. 8;
B. When having transitioned to state IV in FIG. 8; and
C. When having transitioned to state V in FIG. 8.

State III can be determined similarly as with an engine vehicle. Also, an emergency stop operation is the same as with an engine vehicle. For state IV, if the electric power source state is detected as an ACC state, not as a READY-ON state, there is no need to determine whether the engine stops. For state V, the electric power source state is an IG-ON state, not a READY-ON state as is.

A message: "Hybrid system makes an emergency stop, by keep pushing the power switch",
alarm sound 1: intermittent buzzer sound;
B message: "Shift to N range and push the power switch for restarting",
alarm sound 2: continuous buzzer sound; and
C message: "Shift to N range and push the power switch for restarting",
alarm sound 2: continuous buzzer sound.

Therefore, for a hybrid vehicle or an EV, by using READY-ON states, a state in which the message B or C is to be displayed can be detected more precisely than for an engine vehicle. Since a hybrid vehicle can travel normally by the electric motor even when the engine stops, the engine stops while traveling for quite a few cases. Also, an EV always travels by the electric motor as the motive power. Therefore, by indicating to the driver that it is not in a READY-ON state, it is possible to securely indicate whether it is in a state in which the engine stops as it is driven by the electric motor, or a state in which it cannot travel even by the electric motor as it is not in a READY-ON state.

As described above, the motive power stoppage guidance apparatus 100 in the present embodiment can indicate that "a vehicle travels in a state where the motive power stops" or "the likelihood is high in that the vehicle travels in a state where the motive power stops".

Second Embodiment

In the present embodiment, a motive power stoppage guidance apparatus 100 will be described that indicates to the driver that "a vehicle travels in a state where the motive power stops" when the motive power stops while traveling.

[Engine Vehicle]

Due to running out of gasoline or the like, an engine stall may be generated with an engine vehicle while traveling (referred to as an "engine stall"). In this case, (a) it is preferable to indicate early on to the driver that the engine stops.

Thereupon, the motive power stoppage guidance apparatus 100 makes at least one of indications of displaying a message and outputting an alarm sound 1 to indicate (a) when an engine stall occurs. The message is, for example, "Engine stopped. Stop the vehicle at a safe place", or the like. Therefore, it is easier for the driver to notice that the engine has stalled.

Also, after having the vehicle stopped, (b) it is preferable to indicate what to do for the engine stoppage. Thereupon, the motive power stoppage guidance apparatus 100 makes at least one of indications of displaying a message and/or outputting an alarm sound 1 to indicate (b) after the vehicle has stopped. The message is, for example, "Engine stopped. Shift to P range", or the like. Therefore, it is easier for the driver to understand measures to be taken after the vehicle stops. [States of Engine and States of Electric Power Source]

Figure 10:
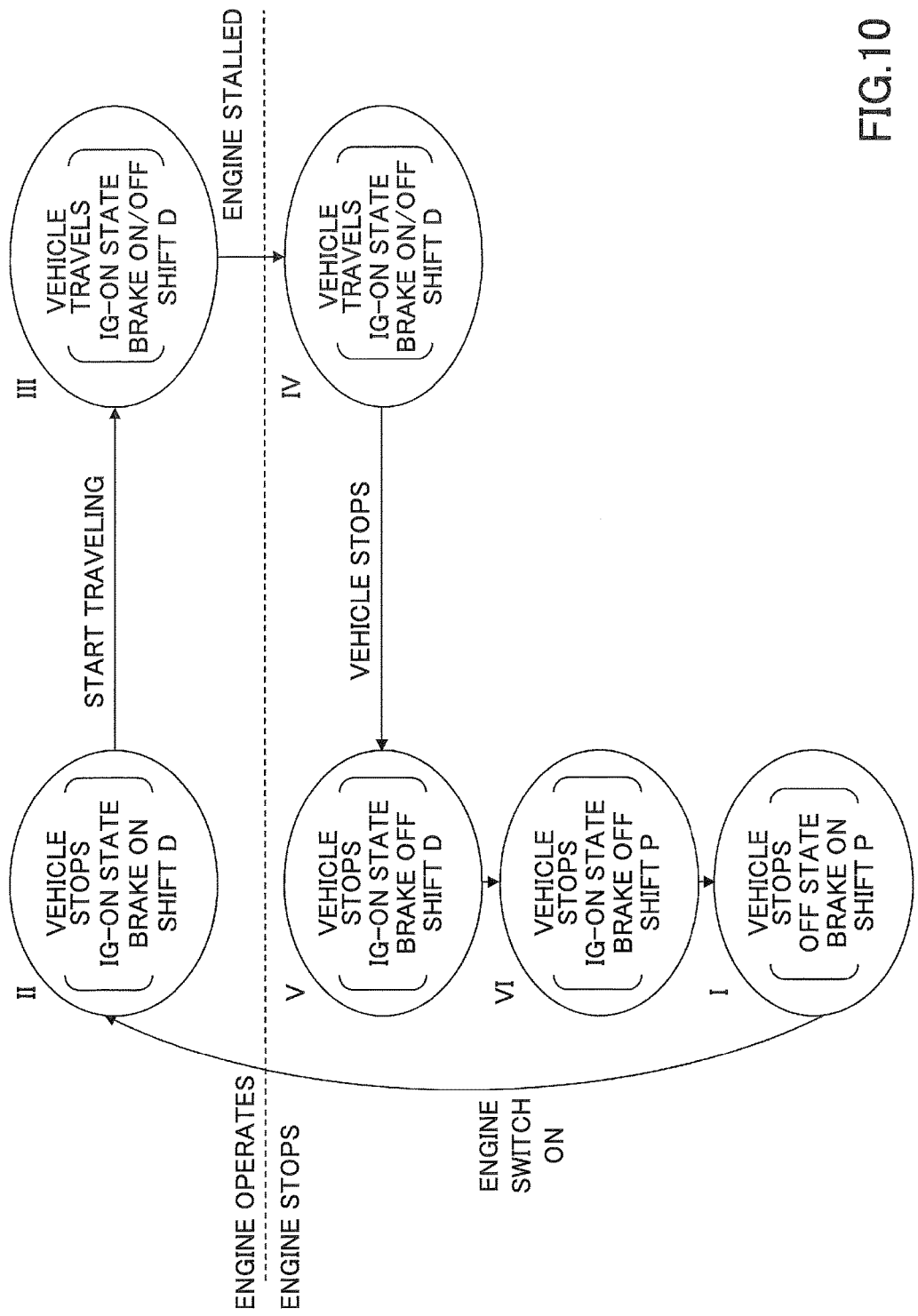
FIG. 10 is an example of a diagram illustrating states of a vehicle and their transitions (second embodiment)

FIG. 10 is an example of a diagram illustrating states of a vehicle and their transitions. Note that a functional block is omitted because it may be the same as that in the first embodiment.

I. A state when the vehicle stops for passengers to get on the vehicle is taken as the initial state. In this state, the electric power source state is an "OFF state". The engine starting condition in this state is as follows:
the brake on;
the shift position at N or P (preferably P); and
the engine switch on.

II. Having the engine started, the electric power source transitions to an "IG-ON state".

III. In the state where the engine has started, if the driver operates the shift lever to D, and steps on the accelerator pedal to have the vehicle travel, the vehicle accelerates to travel at vehicle speed greater than zero.

IV. In state III, if an engine stall occurs, the engine stops, and the vehicle travels while the electric power source state is the IG-ON state. Note that if the shift lever is operated to N in this state to turn on the engine switch, similarly to the first embodiment, the engine can start.

V. When the vehicle stops, it transitions to a stopped state while keeping the IG-ON state. If the shift lever is operated to P (or N) in this state, the engine can start with the same start condition as in state I.

VI. The driver operates the shift position to P range to start the engine. This is a state in which the engine is highly likely to start.

In a state transitioned after the engine has stopped in this way, the indication control unit 36 display a message, and/or outputs an alarm sound if a predetermined condition is satisfied:

A. When having transitioned to state IV in FIG. 10;
B. When having transitioned to state V in FIG. 10; and,
C. When having transitioned to state VI in FIG. 10

State IV is detected when the electric power source state is an IG-ON state, and the engine rotational speed is within a range that can be determined as zero or not detected, and the vehicle speed is greater than zero, or it is within a predetermined time after the vehicle speed cannot be detected.

Since state V is transitioned to, from state IV when the vehicle speed is zero, the indication control unit 36 can detect state V when the electric power source state is an IG-ON state, the vehicle speed is zero, and the engine rotational speed is zero.

The indication control unit 36 can detect State VI when the electric power source state is an IG-ON state, the vehicle speed is zero, the engine rotational speed is zero, and the shift position is at P.

Also, messages to be displayed and/or alarm sounds to be output in states IV, V, and VI are, for example, as follows:
A message: "Engine stopped. Stop the vehicle at a safe place",
alarm sound 1: intermittent buzzer sound;
B message: "Engine stopped. Shift to P range",
alarm sound 2: continuous buzzer sound; and
C message: "Push the engine switch while stepping on the brake for starting",
alarm sound: NO.

By message A, it is easier for the driver to understand early on that the vehicle stops. Also, by message B, it is easier for the driver to understand measures to be taken after having the vehicle stopped. By message C, a starting method of the engine is more understandable. Also, by changing the messages and the alarm sounds for A and B, the driver can understand easier that the circumstance has changed, and a current circumstance and measures to be taken for each of the states.

Note that, similarly to the first embodiment, whether to output messages and alarm sounds, and their contents can be designed depending on types of transmissions and keys. FIGS. 11 and 12 are examples of diagrams illustrating correspondences between types of transmissions, and contents of messages and alarm sounds. Note that FIG. 11 illustrates a case for an electronic key, and FIG. 12 illustrates a case for a mecha-key.

<About Start-and-Stop Installed Vehicle>

For an S&S vehicle, although states IV, V, and VI may be generated without an engine stall, messages and alarm sounds are not required because the power management ECU 11 restarts the engine as described in the first embodiment. Therefore, the indication control unit 36 detects by the S&S flag 37 that the power management ECU 11 has the engine stop by the S&S control, and determines whether to display a message and/or to output an alarm sound.

[Operational Steps]

Figure 13:
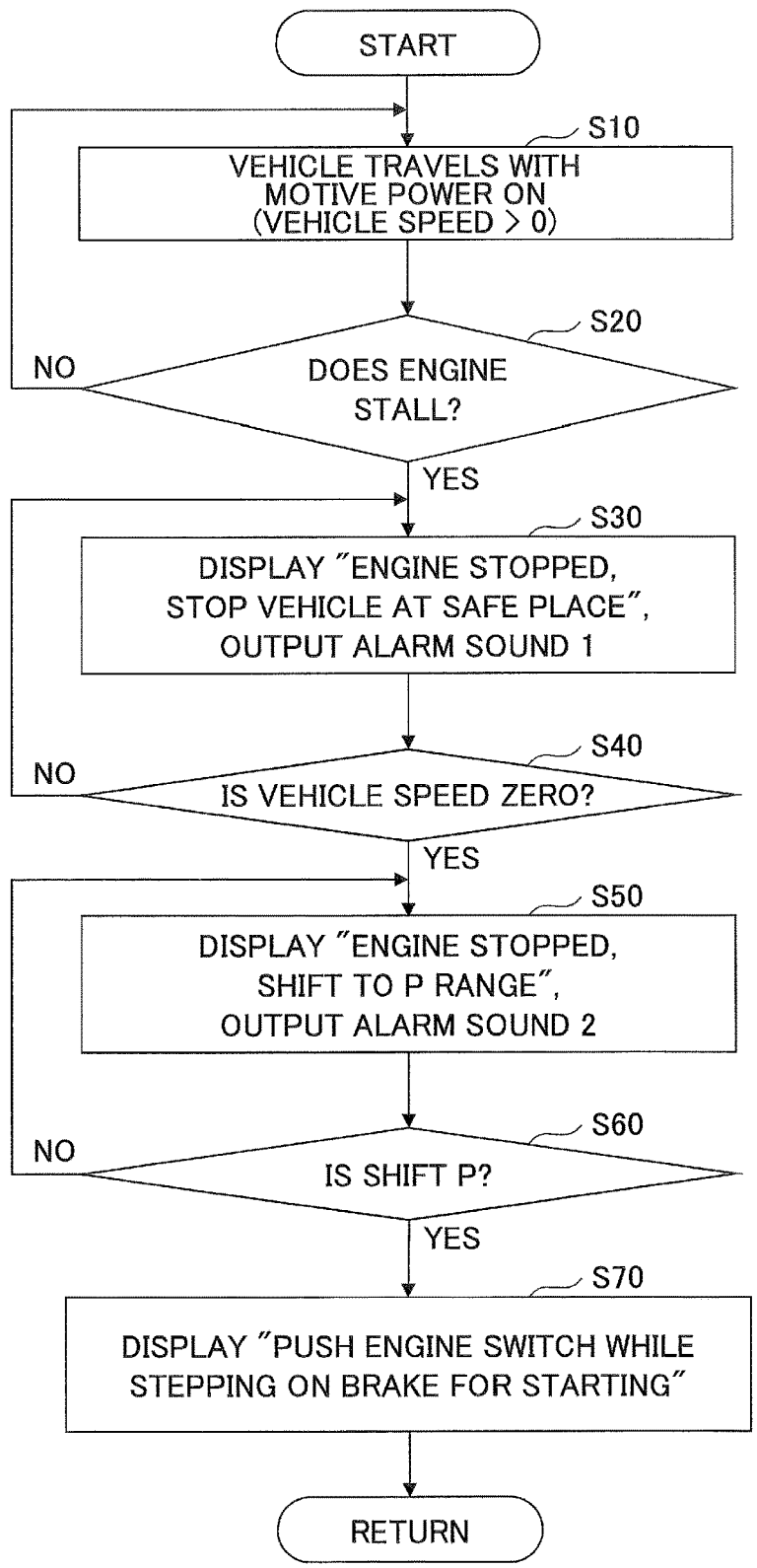
FIG. 13 is an example of a flowchart illustrating an example of operational steps of a motive power stoppage guidance apparatus (second embodiment)

FIG. 13 is an example of a flowchart illustrating an example of operational steps of the motive power stoppage guidance apparatus 100 according to the present embodiment. Steps in FIG. 13 starts with state III in FIG. 10.

Step S10: A vehicle is in a state where the engine operates, the vehicle is traveling, and the electric power source state is an IG-ON state.

Step S20: The indication control unit 36 determines whether an engine stall occurs while traveling. If an engine stall does not occur, the process goes back to Step S10.

Step S30: If an engine stall occurs, the indication control unit 36 displays a message "Engine stopped. Stop the vehicle at a safe place", and/or outputs an alarm sound 1. This makes it easier for the driver to notice early on that the engine stops.

Step S40: The indication control unit 36 determines whether the vehicle speed is zero (the vehicle stops). The displaying and/or outputting at Step S30 continues until the vehicle speed is zero.

Step S50: When the vehicle speed is zero (the vehicle stops), the indication control unit 36 displays a message "Engine stopped. Shift to P range", and/or outputs an alarm sound 2. This makes it easier for the driver to understand that the engine stops, and appropriate measures to be taken.

Step S60: The indication control unit 36 determines whether the shift lever is operated to P range. The displaying and/or outputting at Step S50 continues until the shift lever is operated to P range.

Step S70: When it is operated to P range, the indication control unit 36 displays a message "Push the engine switch while stepping on the brake for starting". This makes it easier for the driver to understand appropriate measures required for starting the engine, in addition to the operation to shift to P range.

[Hybrid Vehicle and EV]

For a hybrid vehicle, an engine stall corresponds to a transition from a READY-ON state to an IG-ON state. For example, a power management ECU in a hybrid vehicle or an EV executes a self-diagnosis periodically to determine whether functions required for traveling are normal. Only when the self-diagnosis determines that they are normal, the power management ECU outputs a READY-ON signal to have other ECUs operate. If the self-diagnosis detects, for example, a temperature abnormality, a voltage abnormality, a sensor abnormality or the like, the power management ECU stops outputting the READY-ON signal, and has the vehicle transition to virtually the same state as an engine stalled state of an engine vehicle.

If the engine rotates in a READY-ON state, the engine comes to stop, or if the engine does not rotate, the engine continues to stop without a change. Therefore, there are cases where it is difficult for the driver to notice transitioning to an IG-ON state. Also, this is the same for an EV; there are cases where it is difficult to notice transitioning from a READY-ON state to a state other than that.

Figure 14:
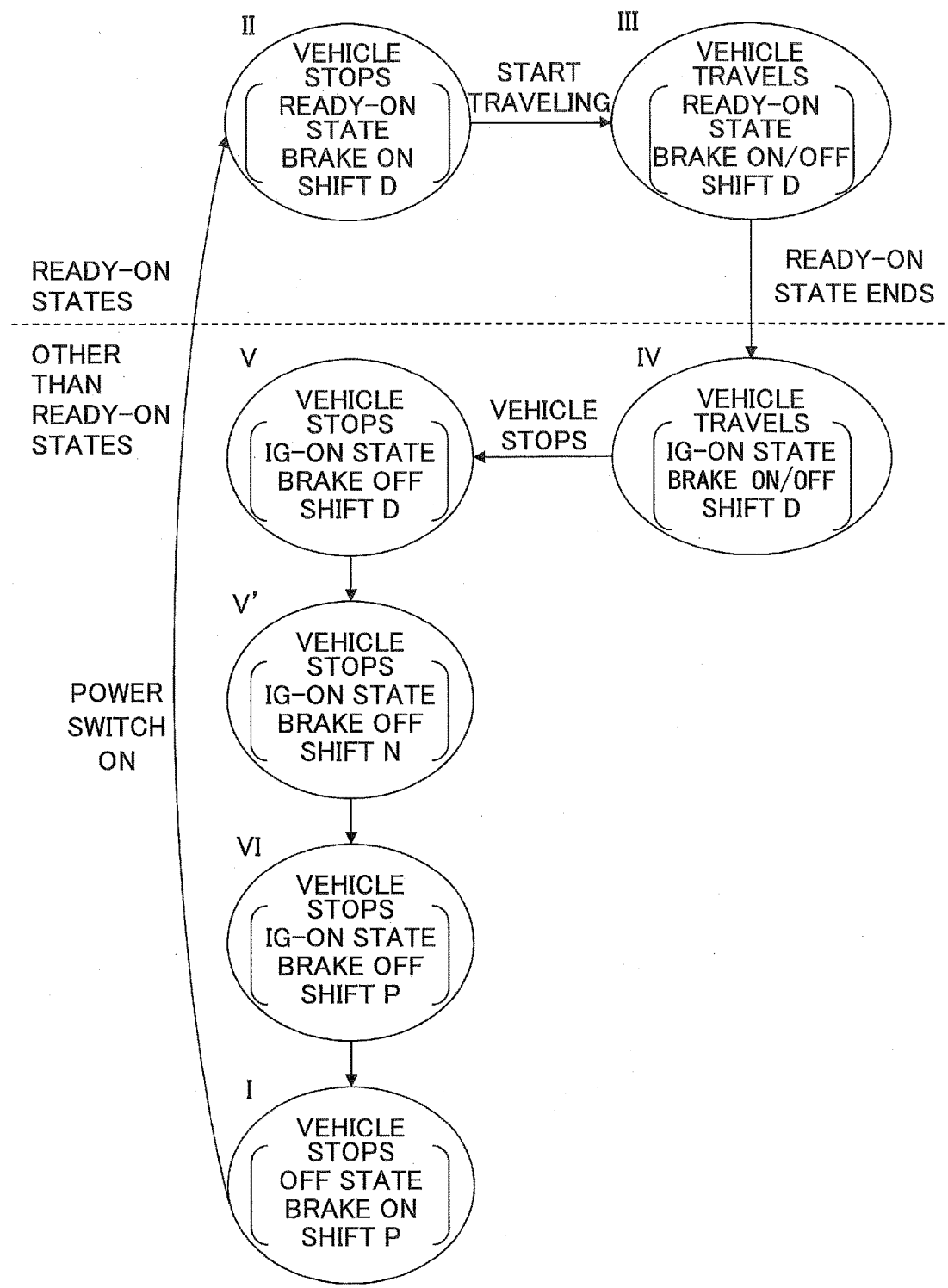
FIG. 14 is an example of a diagram illustrating states of a vehicle and their transitions (second embodiment)

FIG. 14 is an example of a diagram illustrating states of a vehicle and their transitions. The transition diagram is similar to that in FIG. 10 in which "ENGINE OPERATES" is replaced with "READY-ON STATES", and "ENGINE STOPS" is replaced with "OTHER THAN READY-ON STATES".

I. A state when the vehicle stops for passengers to get on the vehicle is taken as the initial state. In this state, the electric power source state is an "OFF state". The READY-ON condition in this state is as follows:
the brake on;
the shift position P; and
the power switch on.

II. When a main system starts, the electric power source transitions to a "READY-ON state".

III. In a state where the main system has started, if the driver operates the shift lever to D, and steps on the accelerator pedal to have the vehicle travel, the vehicle accelerates to travel at vehicle speed greater than zero.

IV. If it goes out of the READY-ON state in state III, the electric power source state transitions to an IG-ON state. The READY-ON condition while traveling is similar to that in the first embodiment:
the shift position D; and
the power switch on.

V. When the vehicle stops, it transitions to a stopped state while keeping the IG-ON state. In this case, it is possible to transition to a READY-ON state with the same start condition as in state I.

V'. The driver may operate the shift position to N similarly to a case with an engine vehicle. This is because it is possible to have the engine start for an engine vehicle, with the shift position at N.

VI. The driver operates the shift position to P range to transition to a READY-ON state. This is a state in which the engine is highly likely to start.

In a state transitioned to in this way, the indication control unit 36 display a message, and/or outputs an alarm sound if a predetermined condition is satisfied:
A. When having transitioned to state IV in FIG. 14;
B. When having transitioned to state V in FIG. 14;
C. When having transitioned to state VI in FIG. 14; and
D. When having transitioned to state V' in FIG. 14.

State IV is detected when the electric power source state is an IG-ON state, and the vehicle speed is greater than zero, or it is within a predetermined time after the vehicle speed cannot be detected. State V, VI, or V' can be detected when the electric power source state is an IG-ON state, the vehicle speed is greater than zero, or it is within the predetermined time after the vehicle speed cannot be detected, and the shift position.

Also, messages to be displayed and/or alarm sounds to be output in states IV, V, VI, and VII are, for example, as follows:
A message: "Hybrid system stopped. Stop the vehicle at a safe place",
alarm sound 1: intermittent buzzer sound;
B message: "Hybrid system stopped. Shift to P range for starting",
alarm sound 2: continuous buzzer sound;
C message: "Push the power switch while stepping on the brake for starting",
D message: "Shift to P range for starting",
alarm sound: NO.

Therefore, for a hybrid vehicle or an EV, by using READY-ON states, when it goes out of the READY-ON state, a message can be displayed and/or an alarm sound can be indicated.

As described above, when the engine stalls, or when it goes out of a READY-ON state, the motive power stoppage guidance apparatus 100 in the present embodiment can indicate that "a vehicle travels in a state where the motive power stops".

Third Embodiment

In the present embodiment, messages and the like will be described that are displayed when a vehicle starts traveling on a slope while the motive power is in a stopped state.

[Engine Vehicle]

Even when the vehicle is in a stopped state, if the driver relaxes the brake on a slope or the like, the vehicle may starts traveling. In this case,
(a) it is preferable to indicate early on that the engine stops to the driver.

Thereupon, the motive power stoppage guidance apparatus 100 makes at least one of indications of displaying a message and outputting an alarm sound 1 to indicate (a) when the vehicle starts traveling or the likelihood is high. The message is, for example, "Engine stopped. Stop the vehicle at a safe place", or the like. Therefore, it easier for the driver to understand measures to be taken.

[States of Engine and States of Electric Power Source]

Figure 15:
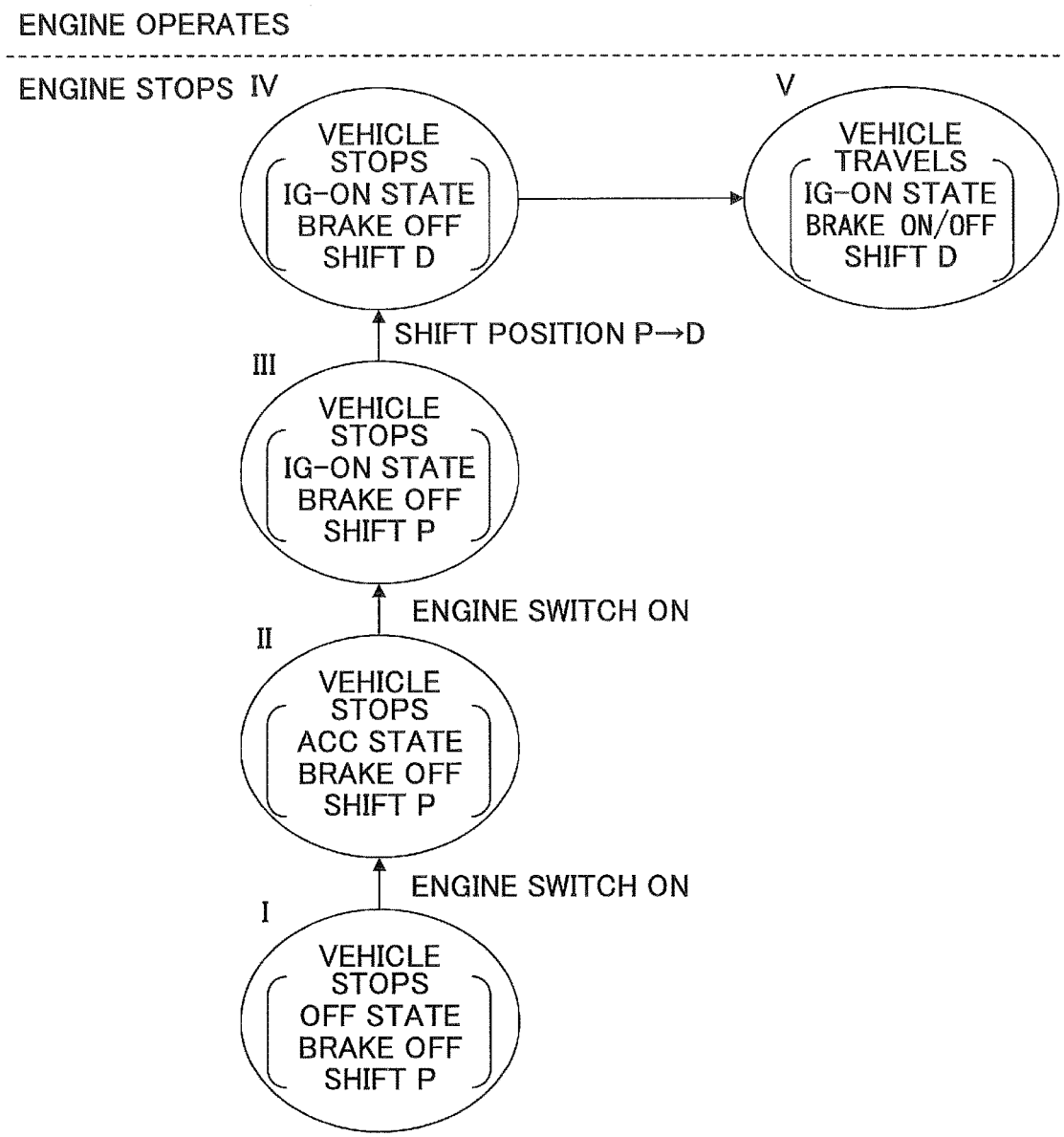
FIG. 15 is an example of a diagram illustrating states of a vehicle and their transitions (third embodiment)

FIG. 15 is an example of a diagram illustrating states of a vehicle and their transitions. Note that a functional block is omitted because it may be the same as that in the first embodiment.

I. A state when the vehicle stops for passengers to get on the vehicle is taken as the initial state. In this state, the electric power source state is an "OFF state". Although the engine starting condition is the same as in the first or second embodiment, the present embodiment does not have the engine start.

II. When the driver presses down the engine switch without stepping on the brake pedal, the electric power source transitions to an "ACC state".

III. When the driver presses down the engine switch without stepping on the brake pedal, the electric power source transitions to an "IG-ON state".

IV. The driver steps on the brake pedal, operates the shift lever from P range to N range, and then, operates to D range. Also, the driver steps off the brake pedal once. When the shift position is not at P, there is likelihood that the vehicle starts traveling on the slope.

V. This is a state in which, to start traveling, the driver does not step on the brake pedal with the shift position at D. Therefore, on the slope, the vehicle starts traveling by the effect of gravity.

In a state transitioned to in this way, the indication control unit 36 display a message, and/or outputs an alarm sound if a predetermined condition is satisfied:

A. When having transitioned to one of states I to III in FIG. 15;
B. When having transitioned to state IV in FIG. 15; and
C. When having transitioned to state V in FIG. 15;

States I to III are detected from the electric power source state, the brake off, and the shift position at P because the electric power source state transitions every time the engine switch turns on. State IV is detected when the electric power source state is an IG-ON state, the brake is off, and the shift position is at D. State V can be easily determined because, in an IG-ON state, the vehicle speed signal can be obtained regardless of whether the engine operates or stops.

Messages to be displayed and/or alarm sounds to be output in states I to III, IV, and V are, for example, as follows. A message: "Push the engine switch while stepping on the brake for starting", alarm sound: NO;

B message: "Engine stopped. Shift to P range", alarm sound 2: continuous buzzer sound;

C message: "Engine stopped. Stop the vehicle at a safe place", alarm sound 1: intermittent buzzer sound.

By message A, it is easier for the driver to understand that the vehicle stops, and a correct engine starting method, and to understand that the engine has not started even though the engine switch has been turned on. Also, by message B, it is possible to indicate that the vehicle stops, and the engine starting method. Also, by message C, it is possible to indicate that there is a risk in which the vehicle may start traveling on the slope, or that the vehicle has actually started traveling on the slope.

In this way, by changing the intensity and contents of indications depending on a degree of a risk for the driver, it is easier for the driver to confirm what actions the driver needs to take in accordance with a message, and to understand whether the driver needs just to quit or resume an action, or to take other measures.

<Circumstances not to be Indicated to Driver>

Incidentally, even if there is likelihood that the vehicle starts traveling when the driver steps off the brake while the vehicle is in a stopped state, it should not be indicated to the driver as long as the driver intentionally has the vehicle start traveling in a motive power stopped state. Such cases include, for example, when the driver has operated the shift lever to N; when the driver intentionally moves the vehicle in a circumstance where traction or pushing by hand is required; and the like. In such circumstances, if an indication is made to the driver by an alarm sound, the driver may feel it troublesome. Thereupon, as described with FIG. 15, even when shifted to D range, an alarm sound is not output in the present embodiment. In this way, for example, even if it is operated from range P to range N in states III to IV, an indication is not executed, and hence, effectiveness of indications and trust can be maintained.

Note that, similarly to the first embodiment, whether to output messages and alarm sounds and their contents can be designed depending on types of transmissions and keys. FIGS. 16 and 17 are examples of diagrams illustrating correspondences between types of transmissions, and contents of messages and alarm sounds. Note that FIG. 16 illustrates a case for an electronic key, and FIG. 17 illustrates a case for a mecha-key.

<About Start-and-Stop Installed Vehicle>

Before the engine starts operating, an S&S vehicle may be considered as the same as an engine vehicle without an S&S function, and hence, states can be determined in the same way.

[Operational Steps]

Figure 18:
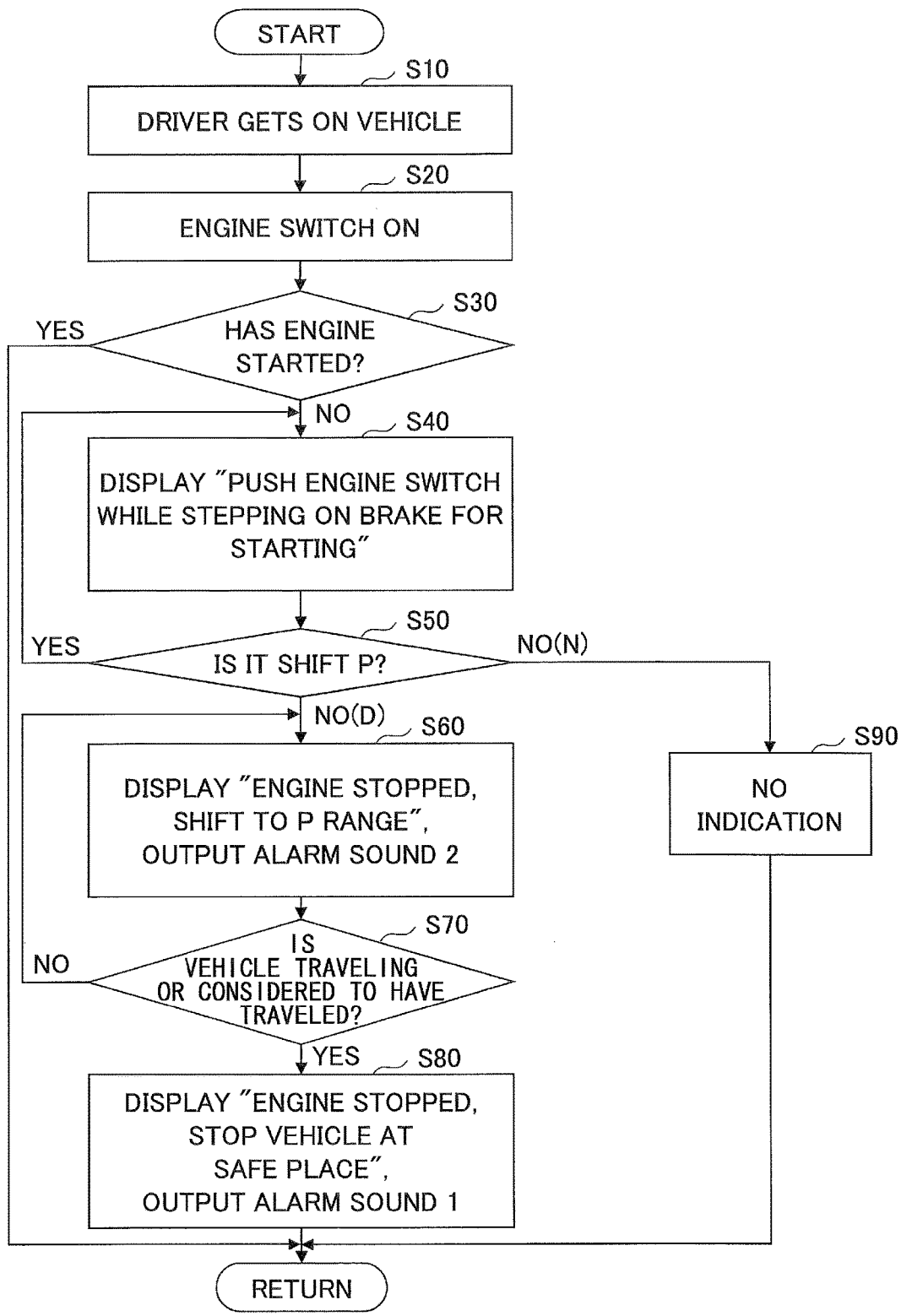
FIG. 18 is an example of a flowchart illustrating an example of operational steps of a motive power stoppage guidance apparatus (third embodiment)

FIG. 18 is an example of a flowchart illustrating an example of operational steps of the motive power stoppage guidance apparatus 100 according to the present embodiment. Steps in FIG. 18 starts with state I in FIG. 15. Also, until reaching state III, the brake pedal is always off.

Step S10: The driver gets on the vehicle. Getting on the vehicle is detected by opening and closing a courtesy switch, and communication between an electronic key and an antenna in the vehicle.

Step S20: The driver turns on the engine switch, but does not step on the brake pedal.

Step S30: The indication control unit 36 determines whether the engine starts. If the brake pedal is on, the engine starts, and the process ends.

Step S40: If the engine does not start, the indication control unit 36 detects that it is in one of states I to III, and displays a message "Push the engine switch while stepping on the brake for starting". This makes it easier for the driver to understand a correct engine starting method, and that the engine has not started even though the engine switch has been turned on.

Step S50: The indication control unit 36 determines whether the shift position is at P range. If at P range, displaying the message at Step S40 continues.

Step S60: If the operational position of the shift lever is at D range, the indication control unit 36 displays a message "Engine stopped. Shift to P range", and/or outputs an alarm sound 2. This makes it easier for the driver to understand that the engine stops, and it is in a state where the engine is ready to start.

Step S70: If the shift position is not at P range but D range, the indication control unit 36 determines whether there is likelihood that the vehicle is traveling or has traveled.

Step S80: If there is the likelihood that the vehicle has traveled, the indication control unit 36 displays a message "Engine stopped. Stop the vehicle at a safe place", and/or outputs an alarm sound 1. This makes it easier for the driver to understand that the driver needs to stop the vehicle.

Step S90: If the shift position is not at P range but is at N range, the indication control unit 36 makes no indication.

[Hybrid Vehicle and EV]

For a hybrid vehicle or an EV, indication timing of a message and/or an alarm sound is virtually the same as that for an engine vehicle. However, for a hybrid vehicle or an EV, it is not possible to transition to a READY-ON state when the shift position is at N range. Therefore, one more message is required. However, as described for an engine vehicle that no alarm sound is output at N range, only displaying a message is executed for a hybrid vehicle or an EV.

Figure 19:
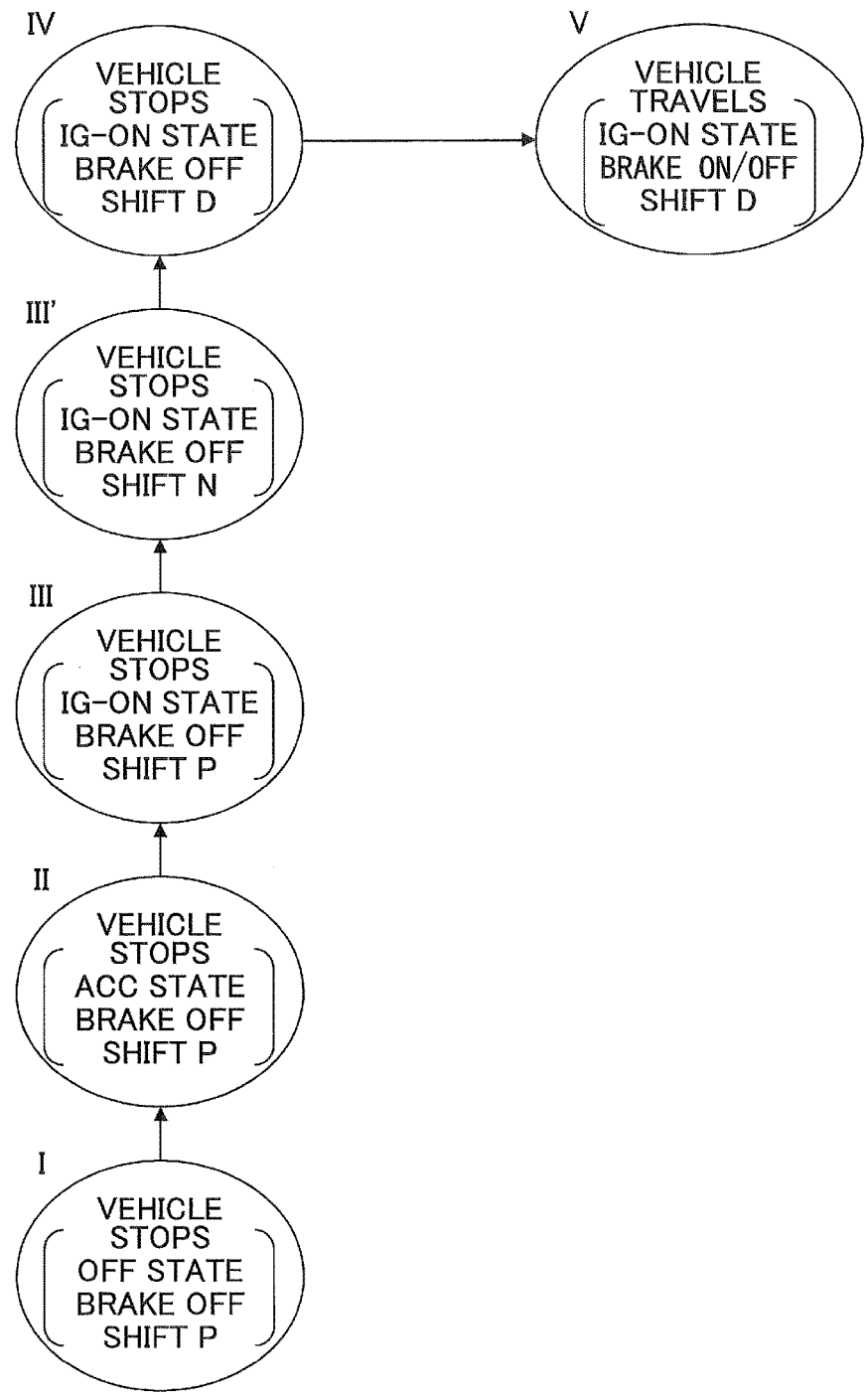
FIG. 19 is an example of a diagram illustrating states of a vehicle and their transitions (third embodiment)

FIG. 19 is an example of a diagram illustrating states of a vehicle and their transitions. The transition diagram is similar to FIG. 15, but there is state III' after III.

I. A state when the vehicle stops for passengers to get on the vehicle is taken as the initial state. In this state, the electric power source state is an "OFF state".

II. When the driver presses down the power switch 29 without stepping on the brake pedal, the electric power source transitions to an "ACC state".

III. When the driver presses down the power switch 29 without stepping on the brake pedal, the electric power source transitions to an "IG-ON state".

III'. The driver steps on the brake pedal, and operates the shift lever from P range to N range. Also, the driver steps off the brake pedal once. When the shift position is not at P, there is likelihood that the vehicle starts traveling on a slope.

IV. To start traveling, the driver operates the shift lever from N to D.

V. If on a slope, the vehicle starts traveling by the effect of gravity.

In a state transitioned to in this way, the indication control unit 36 displays a message, and/or outputs an alarm sound if a predetermined condition is satisfied:

A. When having transitioned to one of states I to III in FIG. 19;
B. When having transitioned to state IV in FIG. 19;
C. When having transitioned to state V in FIG. 19; and
D. When having transitioned to state III' in FIG. 19.

The states A to C can be detected similarly as with an engine vehicle. In state III', the electric power source state is an IG-ON state, the brake is off, and the shift position is at N.

Messages to be displayed and/or alarm sounds to be output in states I to III, IV, V, and III' are, for example, as follows:

A message: "Push the power switch while stepping on the brake for starting",
  alarm sound: NO;
B message: "Hybrid system stopped. Shift to P range",
  alarm sound 2: continuous buzzer sound;
C message: "Hybrid system stopped. Stop the vehicle at a safe place",
  alarm sound 1: intermittent buzzer sound; and
D message: "Shift to P range for starting",
  alarm sound: NO.

By message D, the driver can understand that the shift position needs to be set at P range to transition to a READY-ON state for a hybrid vehicle or an EV. Also, since no alarm sound is output at N range, the driver feels no tiresomeness, and can confirm the message if necessary.

As described above, the motive power stoppage guidance apparatus 100 in the present embodiment can indicate that "a vehicle travels in a state where the motive power stops" or "the likelihood is high in that the vehicle travels in a state where the motive power stops".

Fourth Embodiment

In the present embodiment, displaying messages and/or outputting alarm sounds will be described for a shift-by-wire vehicle. So far, examples have been described for a hybrid vehicle or an EV that assume a shift lever of a cable control method, with which the shift position is switched by an operation on the shift lever by the driver. However, adopting "by-wire" technologies has been underway for vehicles, and such vehicles have begun to have shift levers of shift-by-wire methods installed in which an ECU detects an operation of a shift lever, and the ECU sets the shift position to N by an actuator.

When using a shift lever of a shift-by-wire method, if the driver operates to D or R range in a state other than READY-ON states, an ECU automatically adjusts the shift position to be set at N. Namely, there are cases where even if the driver does not operate to N range, it is set to N range. As described in the third embodiment, although displaying a message and/or outputting an alarm sound should be avoided when the driver operates to N range, if an ECU automatically adjusts the shift position to be set at N, an indication by a message and/or an alarm sound is meaningful. By such indications, it is easier for the driver to better understand that a transition to a READY-ON state cannot be made at non-operational N range, but at P range.

Figure 20:
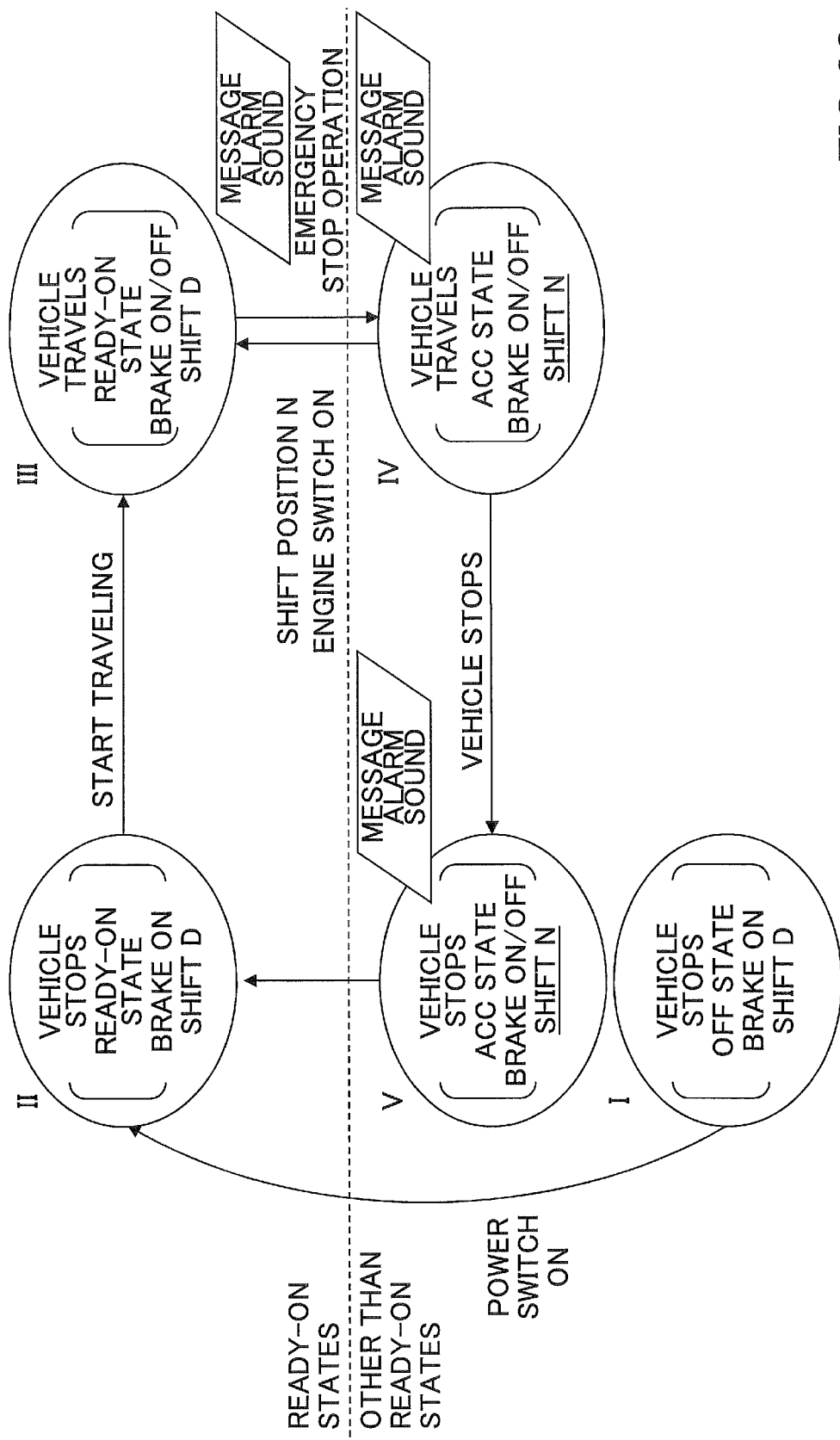
FIG. 20 is an example of a diagram illustrating transitions of electric power source states after an emergency stop operation (shift-by-wire)
Figure 21:
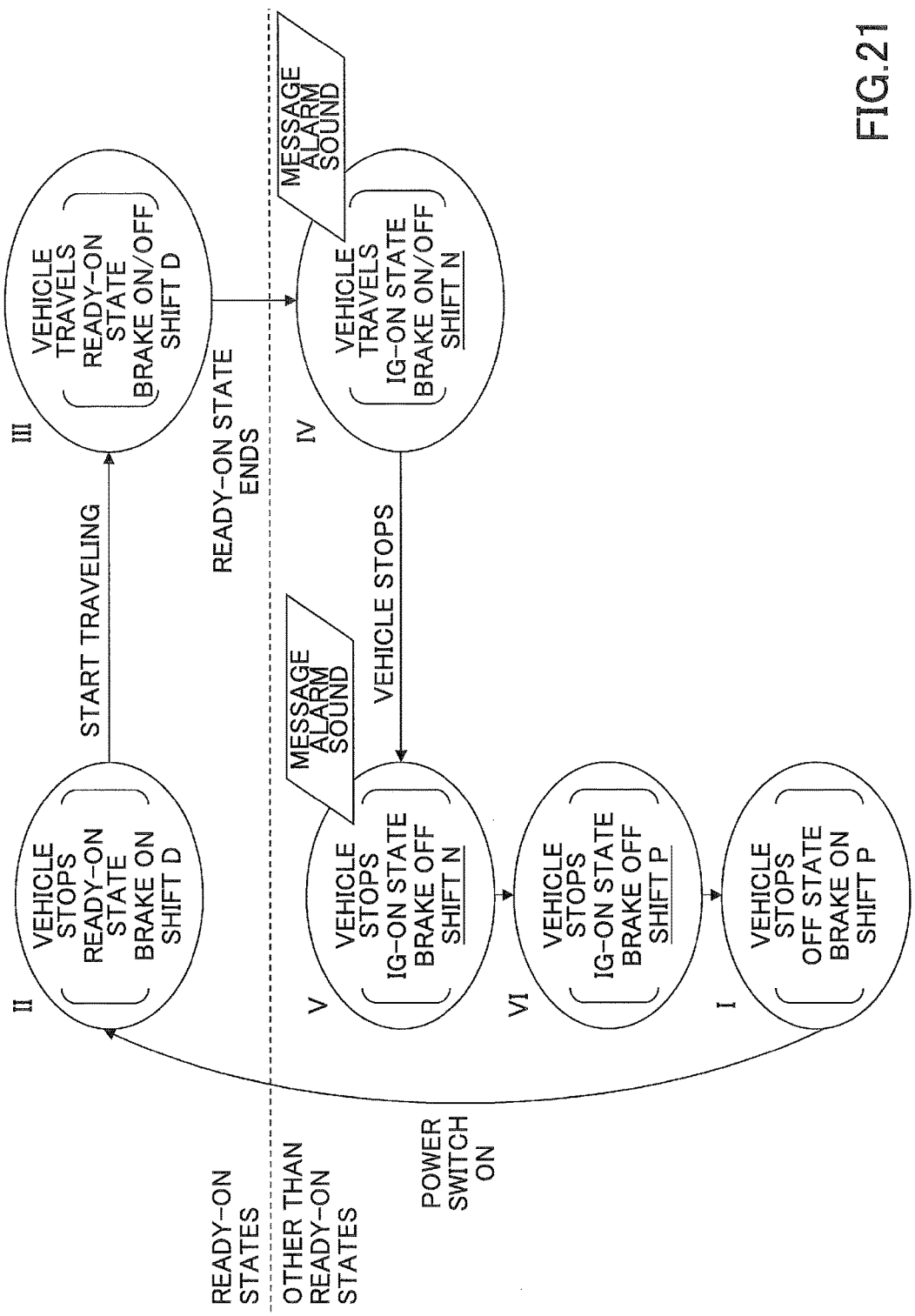
FIG. 21 is an example of a diagram illustrating transitions of electric power source states after transitioning out of a READY-ON state (shift-by-wire)
Figure 22:
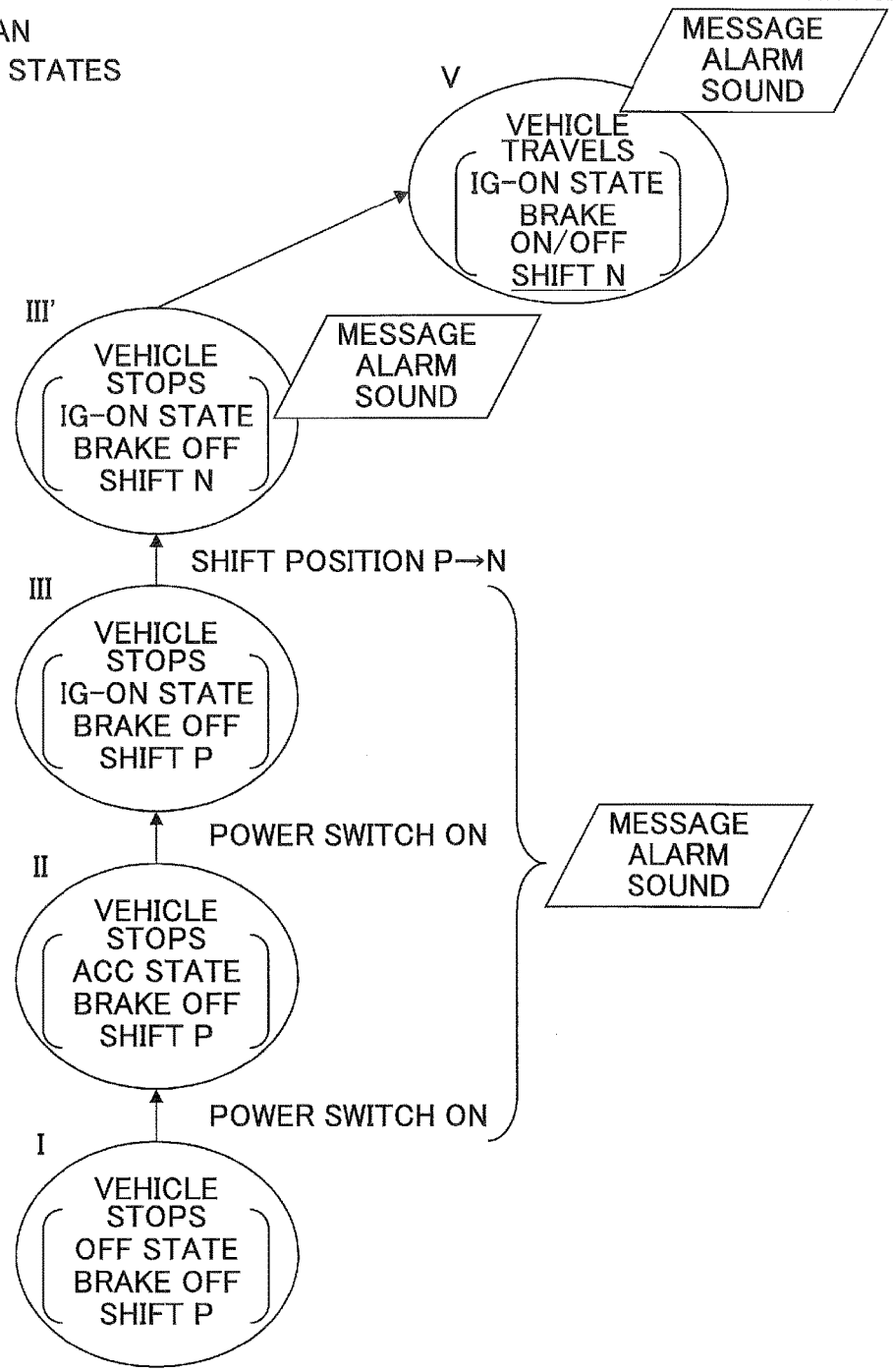

FIG. 20 illustrates transitions of electric power source states after an emergency stop operation; FIG. 21 illustrates transitions of the electric power source states other than READY-ON states; and FIG. 22 illustrates transitions of the electric power source states when transitioning to a READY-ON state on a slope or the like. FIGS. 20, 21 and 22 are transition diagrams for a hybrid vehicle or an EV, and correspond to those described in the first, second, and third embodiments, respectively. An engine vehicle that adopts a shift lever of a shift-by-wire method can also display a message and/or output an alarm sound at N range.

As illustrated in FIG. 20, in state IV or V, the shift position is at N. As illustrated in FIG. 21, in state IV or V, the shift position is at N. As illustrated in FIG. 22, with a shift-by-wire method, there is no state with the shift position at D after state III' because the ECU corrects it to N even if the driver sets the shift position to D.

In FIG. 20, although displaying a message and/or outputting an alarm sound is executed in state III (emergency stop operation), IV, or V, if it is transitioned out of READY-ON states due to an emergency stop operation, the ECU sets the shift position to N range. In FIG. 21, although displaying a message and/or outputting an alarm sound is executed in state IV or V, if it is transitioned out of READY-ON states, the ECU sets the shift position to N range. In FIG. 22, although displaying a message and/or outputting an alarm sound is executed in state I to V, it is the driver that operates the shift position to N. Therefore, if operations are performed to transition from a stopped state to a READY-ON state as in FIG. 22, it may be recorded whether the driver operates the shift lever to N range.

The shift position monitor 32 records that there has been an operation on the shift lever by the driver when detecting that the driver has operated the shift lever to N. Therefore, if the shift position is at N, it can be understood by the record that the driver has operated the shift lever. Also, in FIG. 20 or 21, if the driver operates from N range to another range, and then, to N range, it can be understood by the record that the driver has operated the shift lever.

[Operational Steps]

Figure 23:
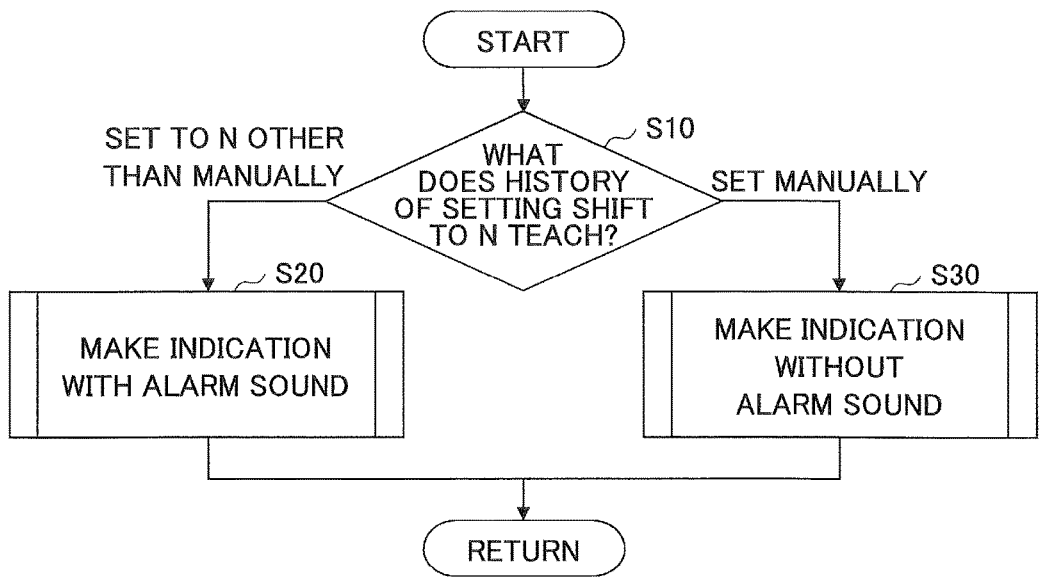
FIG. 23 is an example of a flowchart illustrating an example of operational steps of a motive power stoppage guidance apparatus (fourth embodiment)

FIG. 23 is an example of a flowchart illustrating an example of operational steps of the motive power stoppage guidance apparatus 100 according to the present embodiment. FIG. 23 starts after YES at Step S90 in FIG. 7 in the first embodiment, when it is set to N range by the shift lever or by the ECU. In the second embodiment, it starts after Step S50 in FIG. 13, when it is set to N range by the shift lever or by the ECU. In the third embodiment, it is executed at Step S90 in FIG. 18.

Step S10: The indication control unit 36 determines whether the history of setting the shift position to N indicates a driver's operation.

Step S20: If setting the shift position to N has been done, not by a driver's operation, the indication control unit 36 executes an indication accompanying an alarm sound 1. A message is also displayed if the message is specified to be displayed. In this case, the message is "Engine stopped. Shift to P range". Thus, the driver can understand that the engine stops, and measures for starting the engine.

Step S30: If the driver operates the shift lever to N, the indication control unit 36 executes an indication without an alarm sound. The message is the same. Thus, the indication can be executed without bothering the driver.

The motive power stoppage guidance apparatus 100 in the present embodiment can make an indication to the driver only in required states, without making the driver feel troublesomeness, for a vehicle that switches the shift position by shift-by-wire, which may set N range even if the driver does not operate to N range.

Fifth Embodiment

In all of state V in FIGS. 3 and 5 in the first embodiment, state IV in FIGS. 10 and 12 in the second embodiment, and state V in FIGS. 15 and 17 in the third embodiment, the vehicle travels; the electric power source state is an IG-ON state; the brake is on or off; and the shift is at D. Namely, there are cases where vehicles reach the same state even if past state transitions are different. In the following, the state is referred to as the "common state".

However, as described in the first to third embodiments, the first embodiment state V differs from state IV in the second embodiment, and state V in the third embodiment in terms of messages and alarm sounds. Namely, a circumstance may arise where the motive power stoppage guidance apparatus 100 cannot determine which indication to execute in the common state.

Thereupon, in the present embodiment, by detecting that "there is a history that the motive power has stopped due to an emergency stop operation in a state having a certain vehicle speed, and never stops thereafter" before a "current moment", messages and alarm sounds are switched so that they are indicated in the common state. This can be applied in the same way to an engine vehicle, as well as a hybrid vehicle and an EV. Also, it is the same for a shift-by-wire vehicle.

Figure 24:
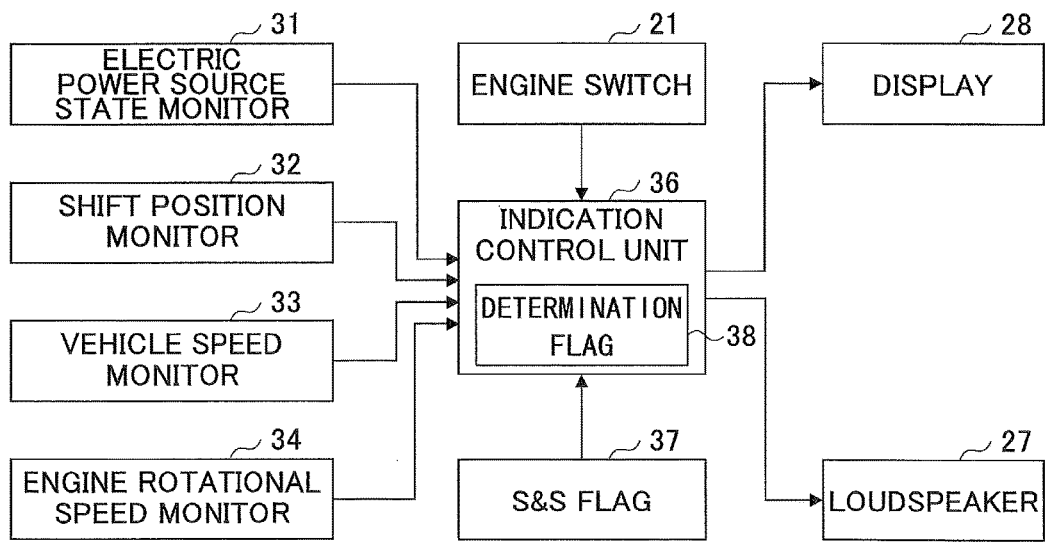
FIG. 24 is an example of a functional block diagram of a motive power stoppage guidance apparatus (fifth embodiment)

FIG. 24 is an example of a functional block diagram of the motive power stoppage guidance apparatus 100. In the present embodiment, the indication control unit 36 includes a determination flag 38, and based on this determination flag, switches messages and alarm sounds to be indicated. ON/OFF conditions of the determination flag 38 are as follows. Determination flag on: When the motive power stopping operation has been executed while traveling (=the vehicle speed is greater than zero), and the motive power stops.

Determination flag off: When the motive power stops.

In state V in the first embodiment, the determination flag is on; and in state IV in the second embodiment and in state V in the third embodiment, the determination flag is off. Therefore, if the determination flag is on, it can be seen that the common state corresponds to state V in the first embodiment.

Note that although all of state V in the first embodiment, state IV in the second embodiment, and state V in the third embodiment have the shift position at D, the shift position is at N in the common state if the driver operates the shift lever to N range. Therefore, the shift position may be at N. Since it is automatically set to N in a shift-by-wire vehicle, the shift position may be at N in the common state.

Figure 25:
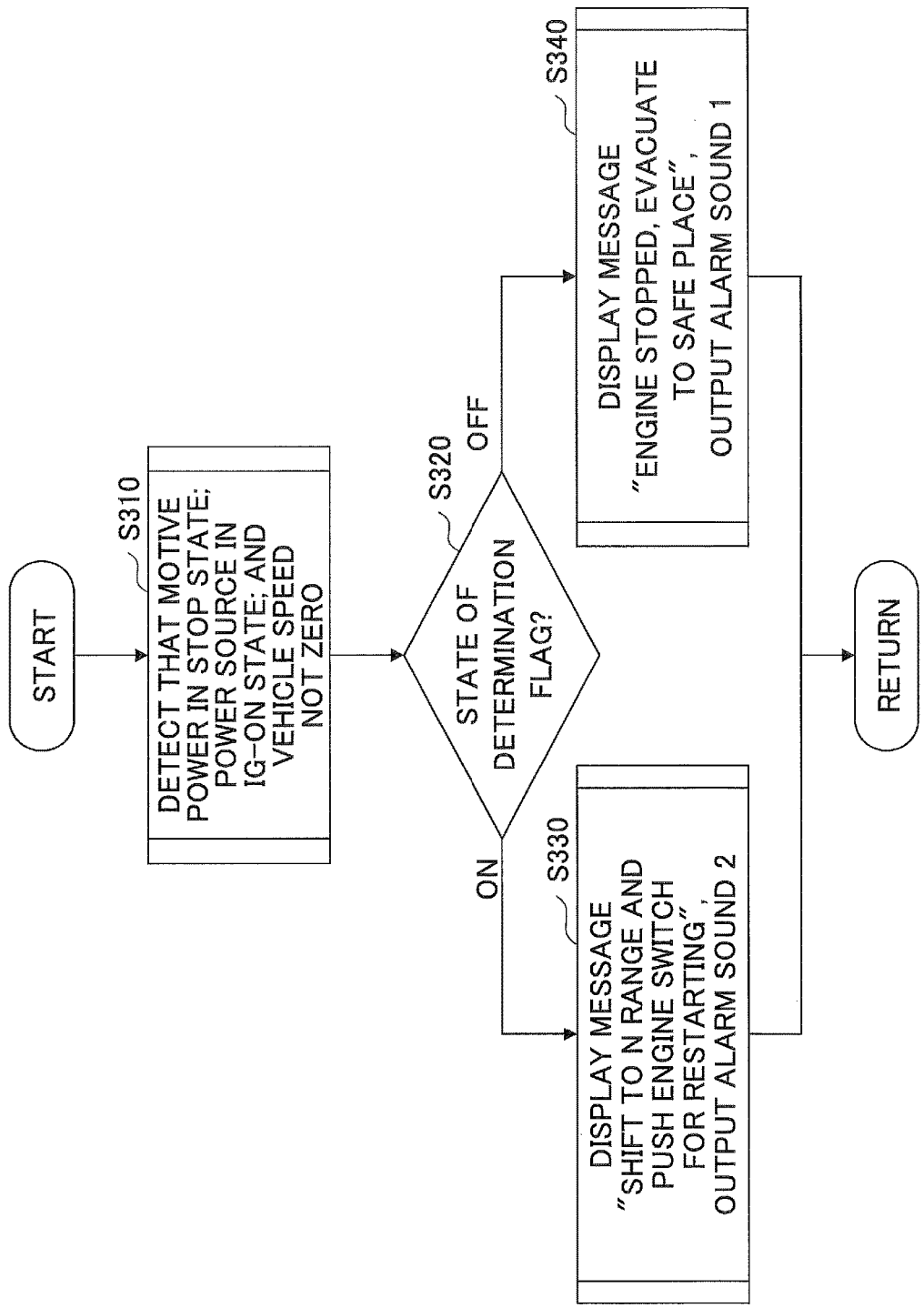
FIG. 25 is an example of a flowchart illustrating determination steps of indication contents in a common state.

FIG. 25 is an example of a flowchart illustrating determination steps of indication contents in the common state. Steps in FIG. 25 are executed, for example, at Step S110 in FIG. 7, for example, at Step S30 in FIG. 13, and for example, at Step S80 in FIG. 18.

First, the indication control unit 36 detects that the motive power is in a stopped state; the electric power source state is an IG-ON state; and the vehicle is traveling (Step S310).

The indication control unit 36 refers to the determination flag (Step S320).

If the determination flag is on, the indication control unit 36 displays a message "Shift to N range and push the engine switch for restarting", and outputs an alarm sound 2 (continuous buzzer sound) (Step S330).

If the determination flag is off, the indication control unit 36 displays a message "Engine stopped. Stop the vehicle at a safe place", and outputs an alarm sound 1 (intermittent buzzer sound) (Step S340).

As described above, the motive power stoppage guidance apparatus 100 in the present embodiment can make an indication in an appropriate indication form by determining a past history having led to the common state.

As above, a motive power stoppage guidance apparatus has been described with embodiments that can make an indication when the motive power stops while traveling, or when the likelihood is high. The present invention is not limited to the above embodiments, but various modifications and improvements can be made within the scope of the present invention.

The invention claimed is:

1. A motive power stoppage guidance apparatus, wherein a motive power for a vehicle is generated by one of an internal combustion engine only by which the vehicle travels, an electric motor only by which the vehicle travels, and an internal combustion engine and an electric motor by at least one of which the vehicle travels, comprising:
   at least one of a display device configured to be disposed in a compartment of the vehicle, and a sound output device configured to output a sound in the compartment of the vehicle; and
   an indication control unit configured, in a case where an operation, performed by a driver of the vehicle, on an engine switch to stop the motive power is detected while traveling, when the vehicle is traveling in a state where the motive power stops, or when the likelihood is high in that the vehicle is traveling in the state where the motive power stops, to execute at least one of having the display device display at least one of that the motive power is in a stopped state, and a recommended operational method, and having the sound output device output an indication sound.

2. The motive power stoppage guidance apparatus, as claimed in claim 1, wherein when the operation, performed by the driver of the vehicle, on the engine switch to stop the motive power has been detected while traveling, before the motive power stops, the indication control unit executes at least one of having the display device display a method of stopping the motive power, and having the sound output device output an indication sound.

3. The motive power stoppage guidance apparatus, as claimed in claim 1, wherein when the operation, performed by the driver of the vehicle, on the engine switch to stop the motive power has been detected while traveling, and the motive power has stopped, the indication control unit executes at least one of having the display device display a method of starting the motive power, and having the sound output device output an indication sound.

4. A motive power stoppage guidance apparatus, wherein a motive power for a vehicle is generated by one of an internal combustion engine only by which the vehicle travels, an electric motor only by which the vehicle travels, and an internal combustion engine and an electric motor by at least one of which the vehicle travels, comprising:
  at least one of a display device configured to be disposed in a compartment of the vehicle, and a sound output device configured to output a sound in the compartment of the vehicle; and
  an indication control unit configured, in a case where an operation on an operational member to stop the motive power is detected while traveling, when the vehicle is traveling in a state where the motive power stops, or when the likelihood is high in that the vehicle is traveling in the state where the motive power stops, to execute at least one of having the display device display at least one of that the motive power is in a stopped state, and a recommended operational method, and having the sound output device output an indication sound,
  wherein the indication control unit executes at least one of having the display device display different messages, and having the sound output device output indication sounds in different ways,
  for a case when an operation on an operational member to stop the motive power has been detected while traveling, and
  for a case when an operation of the operational member to stop the motive power has been detected while traveling, and the motive power has stopped, respectively.

5. The motive power stoppage guidance apparatus, as claimed in claim 1, wherein when the motive power has stopped while traveling, and another operation, performed by the driver, on the engine switch to start the motive power has been detected while traveling, but the motive power does not start, then, the indication control unit executes at least one of having the display device display a method of starting the motive power, and having the sound output device output the indication sound.

6. The motive power stoppage guidance apparatus, as claimed in claim 1, wherein the indication control unit executes at least one of having the display device display different messages, and having the sound output device output indication sounds in different ways,
  for a case when the operation, performed by the driver of the vehicle, of the engine switch to stop the motive power has been detected while traveling, and the motive power has stopped, and
  for another case when the motive power has stopped while traveling, and another operation on the engine switch to start the motive power has been detected while traveling, but the motive power does not start.

7. The motive power stoppage guidance apparatus, as claimed in claim 1, wherein when the motive power has stopped regardless of a predetermined setting condition, the indication control unit executes, while traveling, at least one of having the display device display at least one of that the motive power is in a stopped state, and that the vehicle needs to stop, and having the sound output device output an indication sound,
  wherein when the vehicle has stopped, the indication control unit executes at least one of having the display device display at least one of that the motive power is in a stopped state, and a method of starting the motive power, and having the sound output device output an indication sound.

8. A motive power stoppage guidance apparatus, wherein a motive power for a vehicle is generated by one of an internal combustion engine only by which the vehicle travels, an electric motor only by which the vehicle travels, and an internal combustion engine and an electric motor by at least one of which the vehicle travels, comprising:
  at least one of a display device configured to be disposed in a compartment of the vehicle, and a sound output device configured to output a sound in the compartment of the vehicle; and
  an indication control unit configured, in a case where an operation on an operational member to stop the motive power is detected while traveling, when the vehicle is traveling in a state where the motive power stops, or when the likelihood is high in that the vehicle is traveling in the state where the motive power stops, to execute at least one of having the display device display at least one of that the motive power is in a stopped state, and a recommended operational method, and having the sound output device output an indication sound,
  wherein in a state where the motive power is in a stopped state, and the vehicle stops, when a member to operate a shift position is operated to transition from a P range to a range other than the P range,
  the indication control unit executes at least one of having the display device display that the motive power is in the stopped state, and that an operation should be performed to shift to the P range, and having the sound output device output an indication sound,
  wherein in a state where the motive power is in the stopped state, and the vehicle stops, when a member to operate the shift position is operated to transition from the P range to a range other than the P range, and the vehicle speed becomes greater than or equal to a predetermined value,
  the indication control unit executes at least one of having the display device display that the motive power is in the stopped state, and that the vehicle needs to stop, and having the sound output device output an indication sound.

9. The motive power stoppage guidance apparatus, as claimed in claim 7, further comprising:
  a shift operation recording unit configured, when a shift position is set to an N range, to record whether a member to operate the shift position is operated to transition to the N range,
  wherein when the shift operation recording unit records that the member to operate the shift position has been operated to transition to the N range, the indication control unit executes having the display device display at least one of that the motive power is in the stopped state, and a recommended operational method, without having the sound output device output an indication sound,
  wherein when the shift operation recording unit does not record that the member to operate the shift position has been operated to transition to the N range, the indication control unit executes having the display device display at least one of that the motive power is in the stopped state, and a recommended operational method, or having the sound output device output an indication sound.

10. The motive power stoppage guidance apparatus, as claimed in claim 1, further comprising:
a history information storage unit configured to record whether a reason why the motive power has stopped depends on the operation, performed by the driver of the vehicle, on the engine switch to stop the motive power,
wherein when the motive power has stopped, and an electric power source state and a shift position of the vehicle have come to take a predetermined combination while traveling, the indication control unit refers to the history information storage unit, to switch contents of a message to be displayed, or a sound to be output.

* * * * *